United States Patent
Hwang et al.

(10) Patent No.: US 10,033,202 B2
(45) Date of Patent: Jul. 24, 2018

(54) METHOD AND APPARATUS FOR CONTROLLING BATTERY CHARGING OF DEVICE

(71) Applicant: Samsung Electronics Co., Ltd., Gyeonggi-do (KR)

(72) Inventors: Insung Hwang, Seoul (KR); Jinsoo Ha, Gyeonggi-do (KR); Yongbum Ha, Gyeonggi-do (KR); Sunghoon Kim, Gyeonggi-do (KR); Jaedeok Cha, Gyeonggi-do (KR); Hyungwook Choi, Seoul (KR)

(73) Assignee: Samsung Electronics Co., Ltd (KR)

( * ) Notice: Subject to any disclaimer, the term of this patent is extended or adjusted under 35 U.S.C. 154(b) by 208 days.

(21) Appl. No.: 15/018,269

(22) Filed: Feb. 8, 2016

(65) Prior Publication Data
US 2016/0233692 A1   Aug. 11, 2016

(30) Foreign Application Priority Data
Feb. 6, 2015 (KR) .................. 10-2015-0018701

(51) Int. Cl.
    *H01M 10/44* (2006.01)
    *H01M 10/46* (2006.01)
    *H02J 7/00* (2006.01)
    *G06F 1/26* (2006.01)
    *H04M 1/00* (2006.01)

(52) U.S. Cl.
    CPC .............. *H02J 7/0021* (2013.01); *G06F 1/26* (2013.01); *H02J 7/0031* (2013.01); *H02J 7/0077* (2013.01); *H04M 1/00* (2013.01); *H02J 2007/005* (2013.01); *H02J 2007/0039* (2013.01); *H02J 2007/0059* (2013.01)

(58) Field of Classification Search
    CPC .. H02J 7/0052; H02J 2007/0059; H02J 7/007; H02J 7/04
    USPC ........ 320/107, 114, 127, 128, 134, 135, 136
    See application file for complete search history.

(56) References Cited

U.S. PATENT DOCUMENTS

| 5,557,192 A | 9/1996 | Tamai |
| 6,025,698 A * | 2/2000 | Kim ................. G06F 1/263 320/132 |
| 2010/0033137 A1 | 2/2010 | Guang et al. |
| 2011/0140664 A1 * | 6/2011 | Aradachi ............ H01M 10/441 320/116 |

FOREIGN PATENT DOCUMENTS

| JP | H0795733 | 4/1995 |
| JP | 2002-78220 | 3/2002 |

* cited by examiner

*Primary Examiner* — Edward Tso
(74) *Attorney, Agent, or Firm* — The Farrell Law Firm, P.C.

(57) ABSTRACT

An apparatus for charging a battery of an electronic device is provided. The apparatus includes a battery configured to supply power to the electronic device; a charger configured to charge the battery according to a set charging voltage (V_SET) and a charging current (I_SET); and a controller configured to set the V_SET and the I_SET, and receive an output value of the charger or the battery during charging to re-set the V_SET if the output value corresponds to a pre-set reference range.

18 Claims, 20 Drawing Sheets

METHOD AND APPARATUS FOR CONTROLLING BATTERY CHARGING OF DEVICE

PRIORITY

This application claims priority under 35 U.S.C. § 119(a) to a Korean Patent Application filed on Feb. 6, 2015 in the Korean Intellectual Property Office and assigned Serial No. 10-2015-0018701, the entire contents of which are incorporated herein by reference.

BACKGROUND

1. Field of the Disclosure

The present disclosure relates generally to a method and apparatus for controlling battery charging capable of reducing a charging time, and more particularly, to an apparatus for and a method of decreasing a charging time of a battery by compensating for an equivalence serial resistor (ESR) of a charging path and a battery at a charging voltage to avoid an increase in charging current.

2. Description of the Related Art

Charging time and usage time are emerging issues from a perspective of power of an embedded system including a battery. Usage time indicates a time during which a system may be used while powered only by the battery after the battery has been charged. In general, users want a short charging time and a long usage time. One method of decreasing the charging time is to use a high charging current. However, this method rapidly decreases the lifespan of a battery.

FIG. 1 is a block diagram of a system for charging a battery of an electronic device according to a conventional method.

Referring to FIG. 1, the battery charging method of the conventional technique uses a principle in which a device identifier (ID) of a battery unit 13 is confirmed in a controller unit 11, and a charging voltage (V_SET) and charging current (I_SET) are set by using a charger unit 12 to charge the battery unit 13. The controller unit 11 decides information regarding voltage, current, a failure status, a residual amount, or the like of the battery 13 to determine whether to perform charging.

After setting the charging voltage and current, the battery unit 13 is charged. FIG. 2 is a voltage/current graph for the charging method of FIG. 1. Referring to FIG. 2, a charging current is applied according to the I_SET if a charging amount is small, where this region is referred to as a constant current (CC) region. Thereafter, a region in which the current decreases as the battery voltage increases to converge to V_SET while charging current is accumulated is referred to as a constant voltage (CV) region. Thereafter, a full charge bit for reporting a full charging completion is set in an internal register of the battery unit 13, and the controller unit 11 reads this bit to stop the charging.

FIG. 3 is a block diagram of the charger unit 12 of FIG. 1.

Referring to FIG. 3, in theory, an output-node voltage (V_CHG) of the charger unit 12 must be fully applied to the battery unit 13. However, in practice, a voltage drop occurs due to an ESR inside or between the charger unit 12 and the battery unit 13, that is, an internal resistance of a connector, a field effect transistor (FET) transistor, a routing, or the like. For this reason, the full V_CHG cannot be applied to the battery unit 13, and thus the charging voltage decreases. Since the charging voltage decreases, charging time increases.

Accordingly, there is a need for a method of compensating for a voltage drop caused by the ESR and decreasing a battery charging time.

SUMMARY

An aspect of the present disclosure provides an apparatus and method for decreasing a charging time of a battery by compensating for an ESR of a charging path and a battery at a charging voltage to avoid an increase in charging current.

Another aspect of the present disclosure provides a method of controlling battery charging by monitoring an output value of a charger and a battery on a real time basis and thus performs charging by re-setting a charging voltage (V_SET), where a voltage drop caused by a resistance component inside or between the charger and the battery may be compensated for, and thus a charging time maybe decreased.

In accordance with an aspect of the present disclosure, an apparatus for charging a battery of an electronic device is provided. The apparatus includes a battery configured to supply power to the electronic device; a charger configured to charge the battery according to a set charging voltage (V_SET) and a charging current (I_SET); and a controller configured to set the V_SET and the I_SET, and receive an output value of the charger or the battery during charging to re-set the V_SET if the output value corresponds to a pre-set reference range.

In accordance with another aspect of the present disclosure, a method of controlling battery charging by compensating for a voltage drop between a battery and a charger is provided. The method includes setting a charging voltage (V_SET) and a charging current (I_SET) in association with the charging of the battery; measuring an output value of the battery or the charger during charging; determining whether the output value corresponds to a pre-set reference range; and if the output value corresponds to the pre-set reference range, re-setting the V_SET.

In accordance with another aspect of the present disclosure, a method of controlling battery charging by compensating for a voltage drop between a battery and a charger is provided. The method includes setting a charging voltage (V_SET) and a charging current (I_SET) in association with the charging of the battery; determining whether a battery cell feedback voltage (V_CELL_FB) is less than a battery cell reference voltage (V_CELL_REF); and re-setting, if V_CELL_FB is less than the V_CELL_REF, the V_SET.

BRIEF DESCRIPTION OF THE DRAWINGS

The above and other aspects, features, and advantages of the present disclosure will be more apparent from the following detailed description, taken in conjunction with the accompanying drawings, in which.

DETAILED DESCRIPTION OF EMBODIMENT OF THE PRESENT DISCLOSURE

Figure 1:
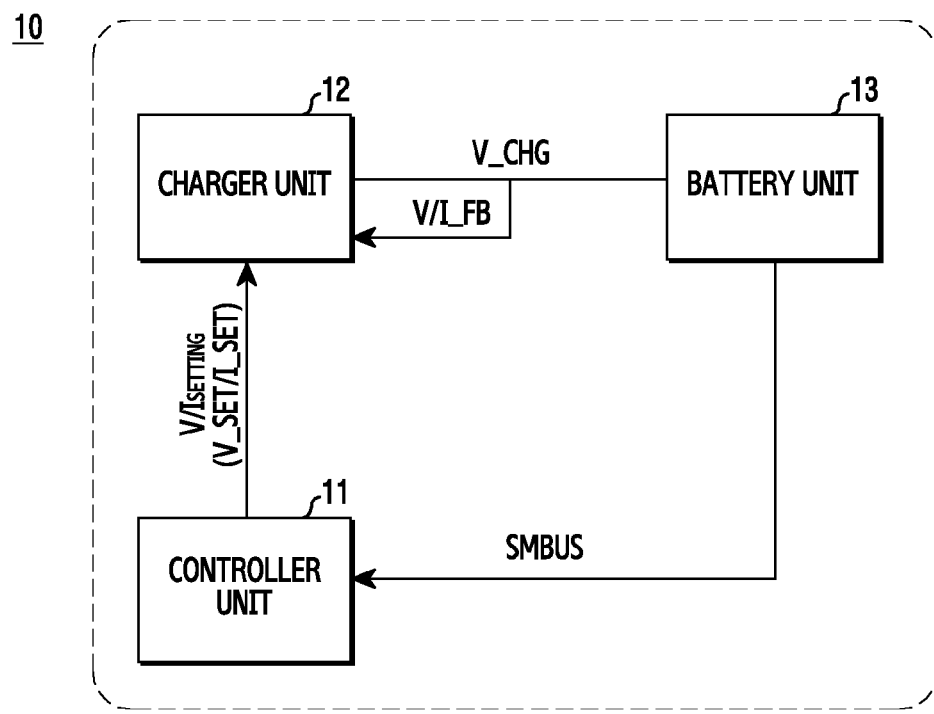
FIG. 1 is a block diagram of a system for charging a battery of an electronic device.
Figure 2:
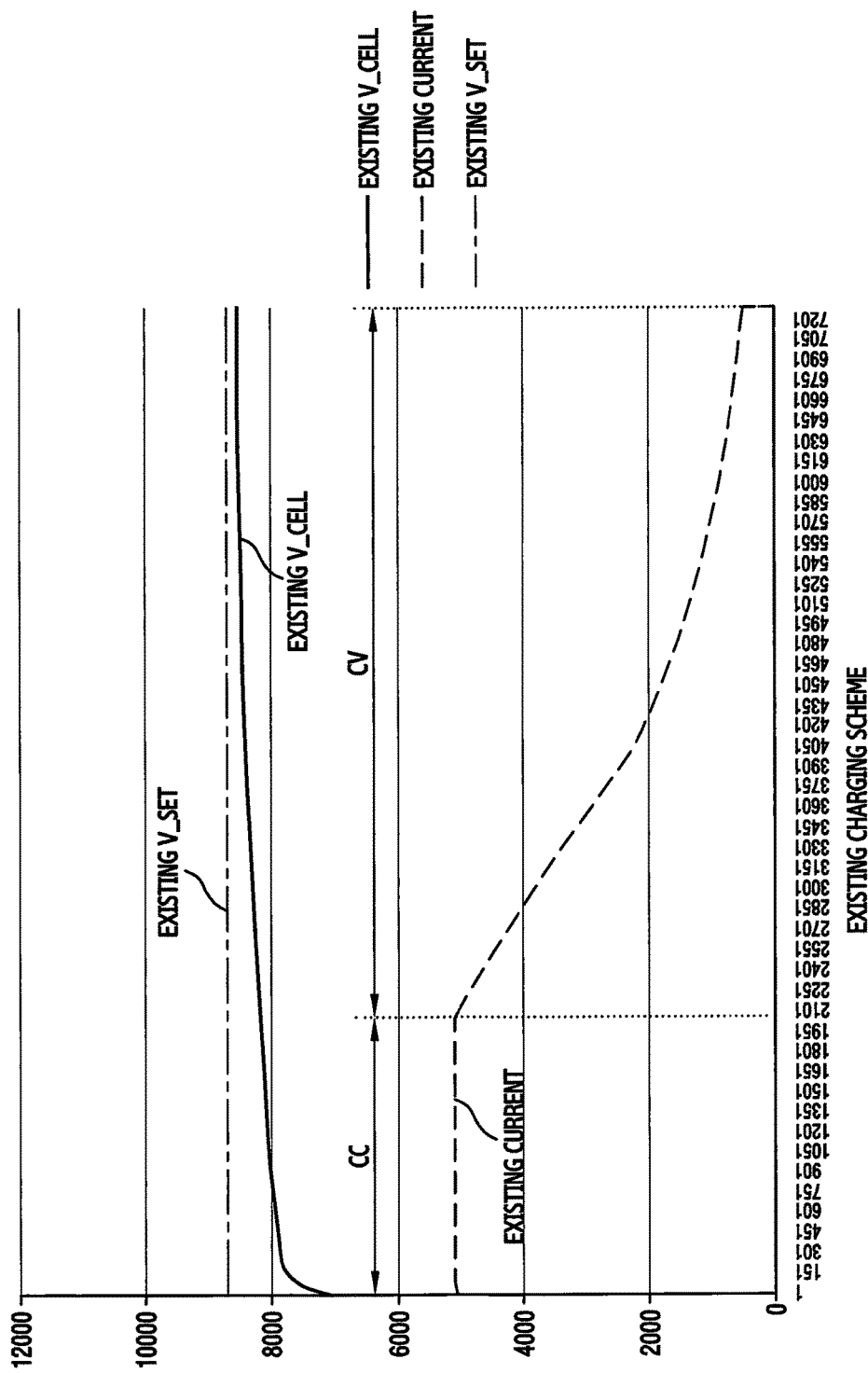
FIG. 2 is a graph illustrating a voltage/current state when performing battery charging.
Figure 3:
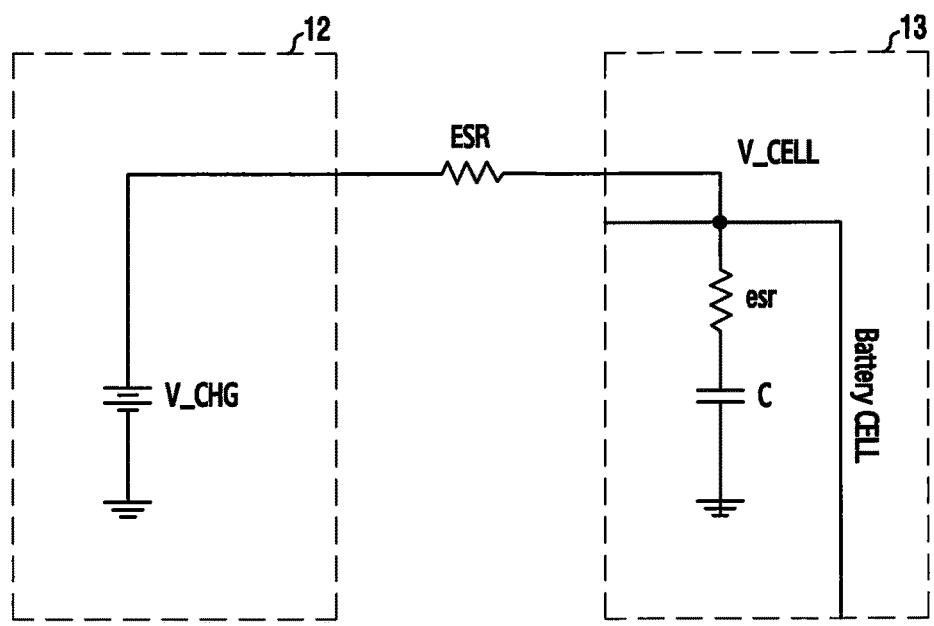
FIG. 3 is a block diagram of a battery charging circuit.

Hereinafter, various embodiments of the present disclosure will be described with reference to the accompanying drawings. In the following description, certain details such as detailed configuration and components are merely provided to facilitate understanding of the present disclosure. Therefore, it should be apparent to those skilled in the art that various changes and modifications of the embodiments described herein may be made without departing from the scope and spirit of the present disclosure. In addition, descriptions of well-known functions and constructions are omitted for clarity and conciseness.

The present disclosure may have various embodiments, and modifications and changes may be made therein. Therefore, the present disclosure will be described in detail with reference to certain embodiments shown in the accompanying drawings. However, it should be understood that the present disclosure is not limited to the embodiments, but is intended to include all modifications/changes, equivalents, and/or alternatives falling within the spirit and the scope of the present disclosure as defined by the appended claims and their equivalents. In describing the drawings, similar reference numerals may be used to designate similar elements.

The terms "have," "may have," "include," and "may include" are used in the present disclosure indicate the presence of disclosed corresponding functions, operations, elements, and the like, but are not intended to limit additional one or more functions, operations, elements, and the like. In addition, it should be understood that the terms "include" or "have" used in the present disclosure indicate the presence of features, numbers, steps, operations, elements, parts, or a combination thereof described in the present disclosure, but do not preclude the presence or addition of one or more other features, numbers, steps, operations, elements, parts, or a combination thereof.

The terms "A or B," "at least one of A and/or B" or "one or more of A and/or B" used in the various embodiments of the present disclosure include any and all combinations of words enumerated with it. For example, "A or B," "at least one of A and B" or "at least one of A or B" indicates (1) including at least one A, (2) including at least one B, or (3) including both at least one A and at least one B.

Although the terms such as "first" and "second" used in various embodiments of the present disclosure may modify various elements of various embodiments, these terms are not intended to limit the corresponding elements. For example, these terms are not intended to limit an order and/or importance of the corresponding elements. These terms may be used for the purpose of distinguishing one element from another element. For example, a first user device and a second user device indicate user devices and may indicate different user devices. For example, a first element may be referred to as a second element without departing from the scope and spirit of various embodiments of the present disclosure, and similarly, a second element may be referred to as a first element.

It will be understood that if an element (e.g., a first element) is "connected to" or "(operatively or communicatively) coupled with/to" another element (e.g., a second element), the element may be directly connected or coupled to another element, but there may be an intervening element (e.g., a third element) between the element and the other element. In contrast, it will be understood that if an element (e.g., a first element) is "directly connected" or "directly coupled" to another element (e.g., a second element), there is no intervening element (e.g., a third element) between the element and the other element.

The term "configured to (or set to)" used in various embodiments of the present disclosure may be used interchangeably with "suitable for," "having the capacity to," "designed to," "adapted to," "made to," or "capable of" according to a situation. The term "configured to (set to)" does not necessarily indicate "specifically designed to" in a hardware level. Instead, the term "apparatus configured to . . . " may indicate that the apparatus is "capable of . . . " along with other devices or parts in a certain situation. For example, "a processor configured to (set to) perform A, B, and C" may be a dedicated processor, e.g., an embedded processor, for performing a corresponding operation, or a general purpose processor, e.g., a central processing unit (CPU) or an application processor (AP), capable of performing a corresponding operation by executing one or more software programs stored in a memory device.

The terms as used herein are used merely to describe certain embodiments of the present disclosure but are not intended to limit the present disclosure. As used herein, singular forms may include plural forms as well unless the context explicitly indicates otherwise. Further, all the terms used herein, should be interpreted to have the same meanings as commonly understood by those skilled in the art to which the present disclosure pertains, and should not be interpreted to have ideal or excessively formal meanings unless explicitly defined in various embodiments of the present disclosure.

A module or program module according to various embodiments of the present disclosure may further include at least one or more elements among the aforementioned elements, or may omit some of them, or may further include additional elements. Operations performed by a module, programming module, or other elements according to various embodiments of the present disclosure may be executed in a sequential, parallel, repetitive, or heuristic manner. In addition, some of the operations may be executed in a different order or may be omitted, or other operations may be added.

An electronic device according to various embodiments of the present disclosure may be a device. For example, a electronic device according to various embodiments of the present disclosure may include at least one of a smartphone; a tablet personal computer (PC); a mobile phone; a video phone; an e-book reader; a desktop PC; a laptop PC; a netbook computer; a workstation, a server, a personal digital assistant (PDA); a portable multimedia player (PMP); a moving picture experts group audio layer 3 (MP3) player; a mobile medical device; a camera; or a wearable device (e.g., a head-mount-device (HMD), electronic glasses, electronic clothing, an electronic bracelet, an electronic necklace, an electronic appcessory, an electronic tattoo, a smart mirror, or a smart watch).

In an embodiment of the present disclosure, an electronic device may be a smart home appliance. For example, such appliances may include at least one of a television (TV); a digital video disk (DVD) player; an audio component; a refrigerator; an air conditioner; a vacuum cleaner; an oven; a microwave oven; a washing machine; an air cleaner; a set-top box; a home automation control panel; a security control panel; a TV box (e.g., Samsung HomeSync®, Apple TV®, or Google TV); a game console (e.g., Xbox® PlayStation®); an electronic dictionary; an electronic key; a camcorder; or an electronic frame.

In an embodiment of the present disclosure, an electronic device may include at least one of a medical equipment (e.g., a mobile medical device (e.g., a blood glucose monitoring device, a heart rate monitor, a blood pressure monitoring device or a thermometer), a magnetic resonance angiography (MRA) machine, a magnetic resonance imaging (MRI) machine, a computed tomography (CT) scanner, or an ultrasound machine); a navigation device; a global positioning system (GPS) receiver; an event data recorder (EDR); a flight data recorder (FDR); an in-vehicle infotainment device; an electronic equipment for a ship (e.g., ship navigation equipment and/or a gyrocompass); an avionics equipment; a security equipment; a head unit for a vehicle; an industrial or home robot; an automated teller machine (ATM) of a financial institution, a point of sale (POS) device at a retail store, or an Internet of Things (IoT) device (e.g., a light bulb, various sensors, an electronic meter, a gas meter, a sprinkler, a fire alarm, a thermostat, a streetlamp, a toaster, sporting equipment, a hot-water tank, a heater, or a boiler and the like).

In an embodiment of the present disclosure, an electronic device may include at least one of a piece of furniture or a building/structure; an electronic board; an electronic signature receiving device; a projector; and various measuring instruments (e.g., a water meter, an electricity meter, a gas meter, or a wave meter).

An electronic device according to an embodiment of the present disclosure may also include a combination of one or more of the above-mentioned devices. Further, it will be apparent to those skilled in the art that an electronic device is not limited to the above-mentioned devices.

Herein, the term "user" may indicate a person who uses an electronic device or a device (e.g., an artificial intelligence electronic device) that uses the electronic device. Below, a description may be provided for a technology for selection of at least one area of a web page in an electronic device according to an embodiment of the present disclosure.

According to an embodiment of the present disclosure, a web page may represent contents of which at least a partial area consists of a plurality of tags (i.e., symbols indicating instructions) through programming languages such as hypertext markup language (HTML), extensible markup language (XML), etc. The web page may include contents (e.g., a word document and a portable document format (PDF) document) constructed in a format of an electronic document.

Terms used to describe a method of controlling battery charging of an electronic device according to an embodiment of the present disclosure are summarized as follows. For example, V_SET_DESIGN: battery nominal charging voltage;
I_SET_DESIGN: battery nominal charging current;
V_SET: (set) charging voltage;
I_SET: (set) charging current;
V_CHG: charger's output-node voltage;
I_CHG: charger's output-node current;
V_CHG_FB: charger's feedback voltage;
I_CHG_FB: charger's feedback current;
voltage step: a reference value if V_SET is increased or decreased step by step;
current step: a reference value if I_SET is increased or decreased step by step;
V_CELL: battery cell voltage;
V_CELL_FB: battery cell feedback voltage;
I_CELL: battery cell current;
I_CELL_FB: battery cell feedback current;
V_CHG_REF: charger's output-node reference voltage; and
V_CELL_REF: battery cell reference voltage.

Figure 4:
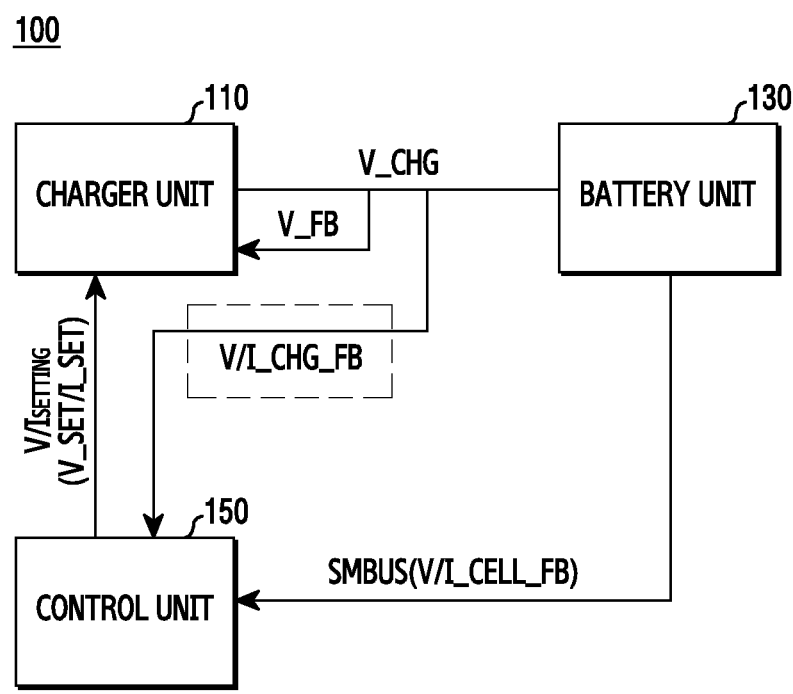
FIG. 4 is a block diagram of a battery charging equipment of an electronic device in according with an embodiment of the present disclosure.

FIG. 4 is a block diagram of a battery charging equipment of an electronic device in according with an embodiment of the present disclosure.

Figure 5:
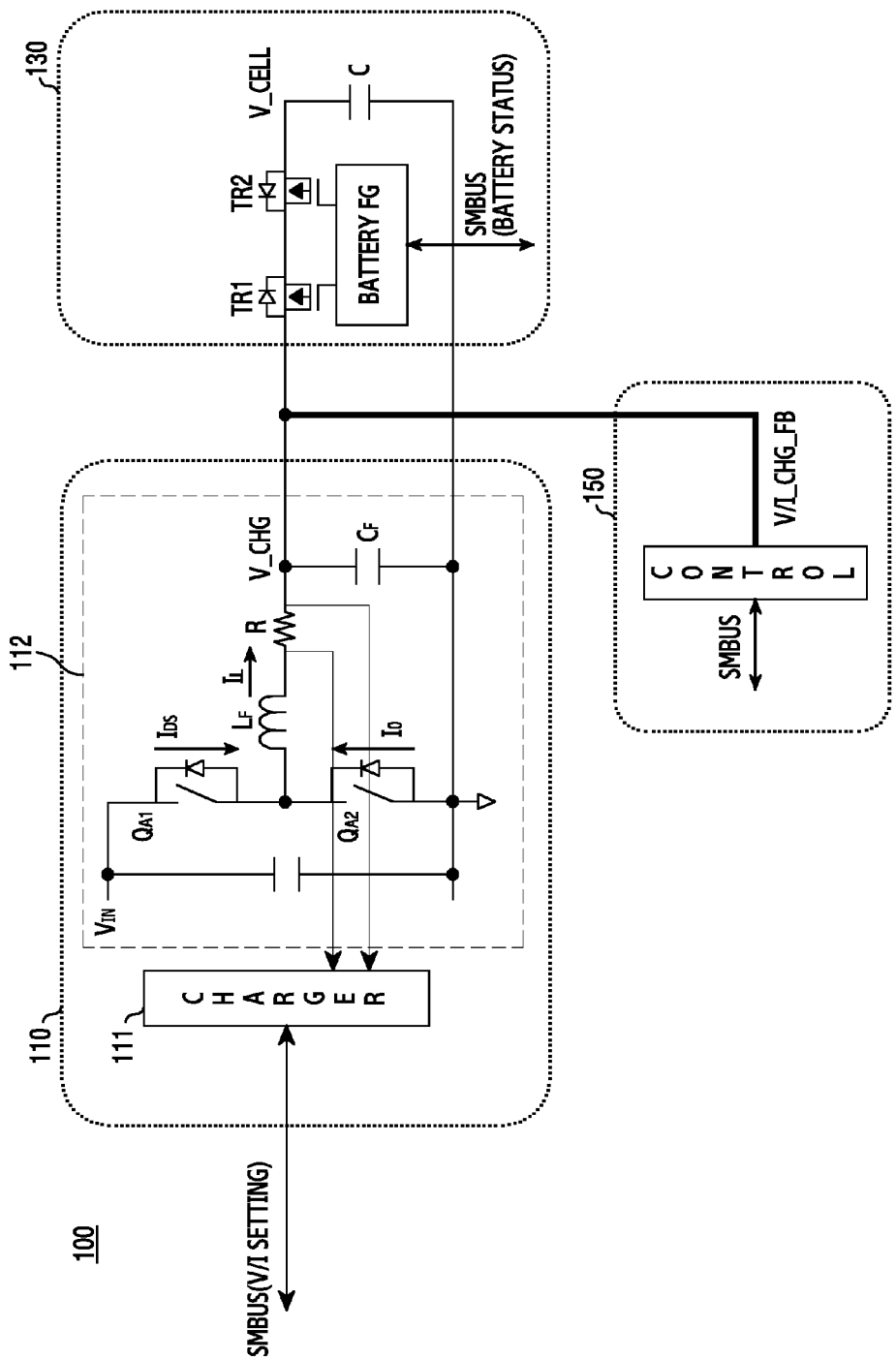
FIG. 5 is a circuit diagram illustrating battery charging of an electronic device in according with an embodiment of the present disclosure.

FIG. 5 is a circuit diagram illustrating battery charging of an electronic device in according with an embodiment of the present disclosure.

Figure 6:
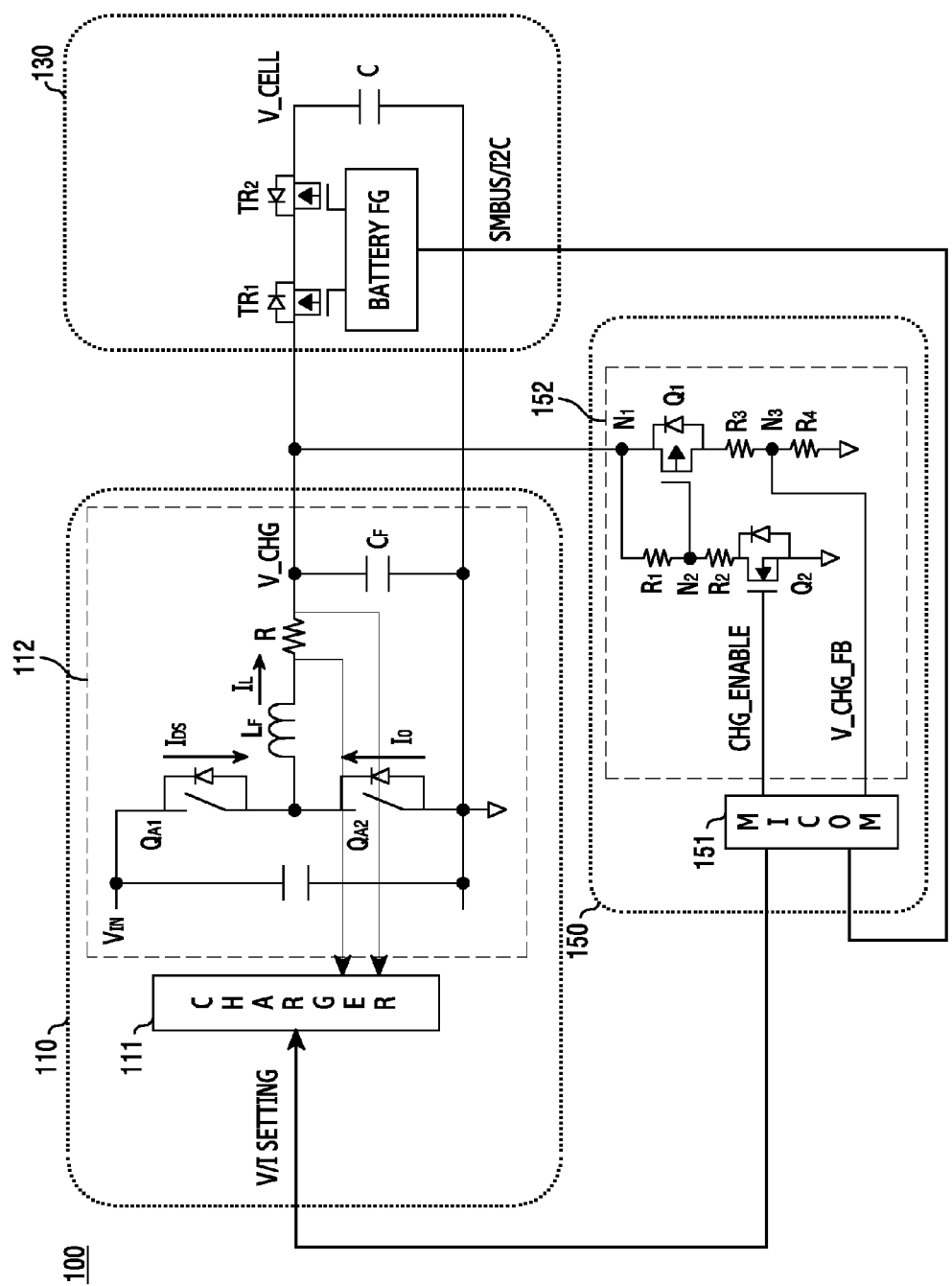
FIG. 6 is a circuit diagram illustrating a signal flow for battery charging of an electronic device according to an embodiment of the present disclosure.

FIG. 6 is a circuit diagram illustrating a signal flow for battery charging of an electronic device according to an embodiment of the present disclosure.

Referring to FIGS. 4 and 5, a battery charging equipment of an electronic device 100 includes a charger unit 110, a battery unit 130, and a control unit 150.

The charger unit 110 may include a charger 111 and is coupled to the charger 111 and the battery unit 130. The charger unit 110 receives power supplied from the charger 111 and supplies charging power to the battery unit 130 and the electronic device 100. As shown in FIG. 5, the charger unit 110 may include a circuit 112 for supplying charging power to the battery unit 130 and the electronic device 100. Since an operation of the circuit 112 is the same as an operation of a circuit included in a typical charger, detailed descriptions thereof are omitted. The charging power supplied by the charger unit 110 may be used to charge the battery unit 130 and/or operate the electronic device 100. The charger unit 110 may increase or decrease a charging voltage under the control of the control unit 150. The charger unit 110 may be implemented, for example, in a form of an integrated circuit (IC).

The battery unit 130 may be charged by the charger unit 110. Further, the battery unit 130 supplies power to the electronic device 100 in a state of not being coupled to the charger 111. The battery unit 130 includes FETs TR1 and TR2, which are capable of turning on or turning off charging/discharging, a circuit (i.e., battery gage (FG)) for calculating a charging amount and for ensuring safety such as overvoltage and overcurrent protection, or the like, and a communication line (i.e., system management bus/inter-integrated circuit (I2C) (SMBUS/I2C)), which is capable of monitoring voltage/current or the like of the battery unit 130. In this case, the communication line may use power management bus (PMBUS), universal asynchronous receiver/transmitter (UART), mobile industry processor interface (MIPI), serial peripheral interface bus (SPI), three wire sensing (3wire), four wire sensing (4wire), or the like in addition to the SMBUS/I2C.

The control unit 150 determines V_SET and I_SET for charging the battery unit 130. Accordingly, battery charging starts if V_CHG of the charger unit 110 and I_CHG of the charger unit 110 are determined. Further, the control unit 150 receives the V_CHG and the I_CHG in a feedback manner to monitor V_CHG_FB of the charger 110 and I_CHG_FB of the charger 110, which may be collectively referred to as "V/I_ CHG_FB," and detects a voltage and a current of a battery cell node through the communication line SMBUS/I2C to monitor V_CELL_FB and I_CELL_FB. The control unit 150 includes a circuit 152 shown in FIG. 6, which operates as a switch to sense voltage and current of the charger unit 110 and the battery unit 130 only during the charging.

Referring to FIG. 6 and Table 1 below, the operation of the circuit 152 for sensing a voltage and a current of the charger unit 110 and the battery unit 130 only during battery charging is performed as follows.

TABLE 1

|  | CHG_ENABLE | Q2 | N2 | Q1 | N1 |
|---|---|---|---|---|---|
| CHARGE | HIGH | ON | HIGH | ON | V_CHG |
| NON-CHARGE | LOW | OFF |  | OFF |  |

During charging, CHG_ENABLE, which is a signal for enabling the charger is input as a high signal in the control unit 150, and thus a second transistor Q2 is turned on. As a result, if a voltage is applied to a second node N2, a high signal is input to a gate of a first transistor Q1, and thus the first transistor Q1 is turned on. Accordingly, the V_CHG applied to the first node N1 is reduced and applied to a third node N3, where it is detected by the control unit 150.

In an embodiment of the present disclosure, the control unit 150 may execute four methods to compensate for a voltage drop caused by a resistance component ESR generated between the charger unit 110 and the battery unit 130 at V_SET. Although a reference of re-setting the V_SET is different in the four methods, the voltage drop caused by the ESR is compensated for eventually, thereby being able to decrease a charging time. Specific references for charging the V_SET until a charging end condition is satisfied and a method of decreasing a charging time by using the references will be described below with reference to FIGS. 6 to 16.

Table 2 below illustrates different references for varying V_SET in four different embodiments of the present disclosure, which are referred to as QC1, QC2, QC3, and QC4, respectively.

TABLE 2

|  | QC1 | QC2 | QC3 | QC4 |
|---|---|---|---|---|
| V_SET UP | V_CELL_REF > V_CELL_FB | I_SET > I_CELL_FB AND V_CELL_REF > V_CELL_FB | ΔV_CELL < ΔV_CELL_REF AND V_CELL_REF > V_CELL_FB | V_CHG_FB = V_SET AND V_CELL_REF > V_CELL_FB |
| V_SET DOWN |  | V_CELL_FB > V_CELL_REF |  |  |

Figure 7:
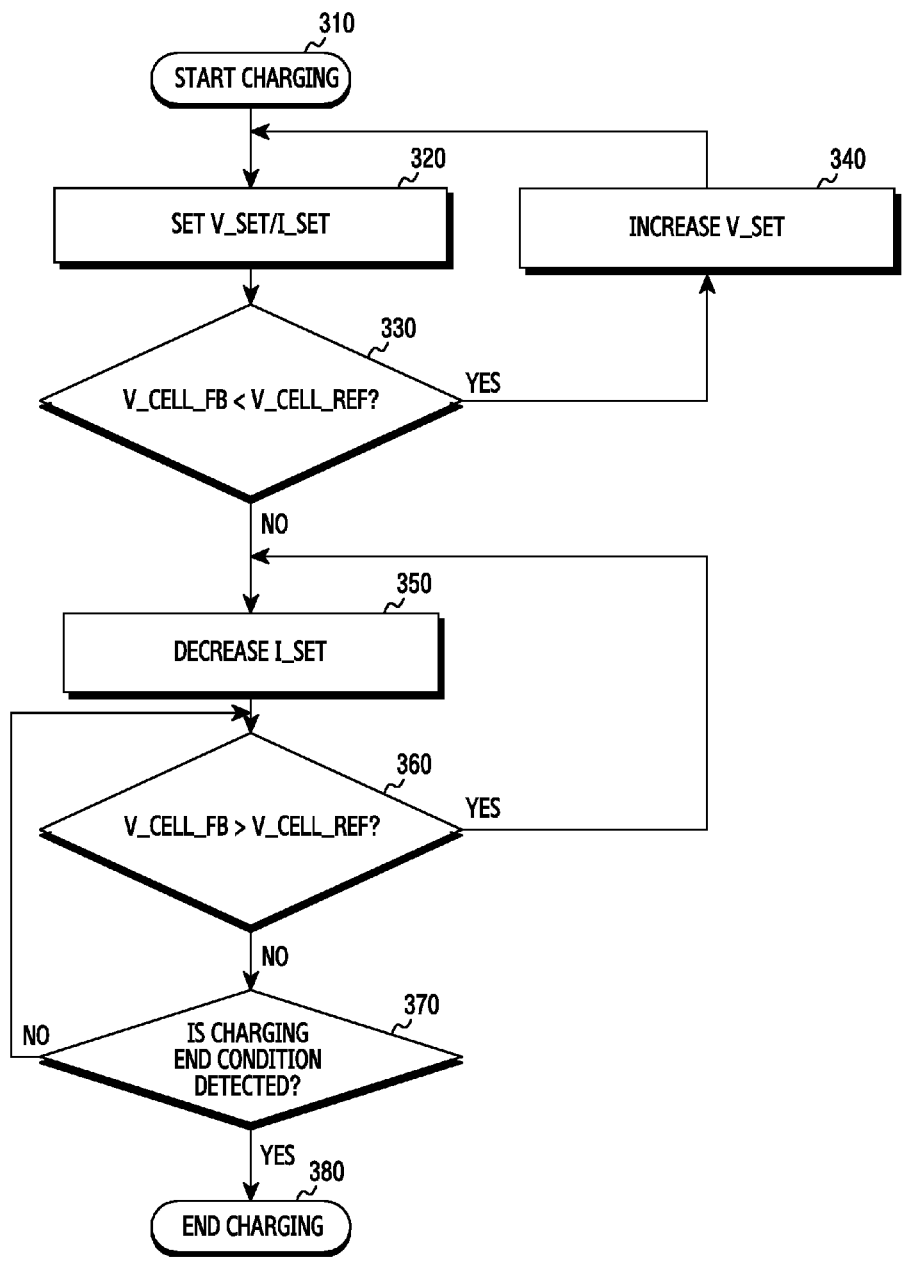
FIG. 7 is a flowchart of a charging method according to an embodiment of the present disclosure.

FIG. 7 is a flowchart of a charging method according to an embodiment of the present disclosure (e.g. QC1).

Referring to FIG. 7, the control unit 150 starts charging the battery 130 in step 310, and sets V_SET and I_SET in association with the charging of the battery unit 130 in step 320. In this case, V_SET_DESIGN may be set. For example, if charging voltage per battery cell is 4.35V, if two or three or four battery cells are coupled to each other in series, the V_SET_DESIGN is set to 8.7V/13.05V/17.4V, respectively.

In step 330, the control unit 150 determines whether V_CELL_FB is less than V_CELL_REF.

If it is determined that V_CELL_FB is less than V_CELL_REF, the control unit 150 re-sets the V_SET in step 340. The re-setting of the V_SET increases the V_SET step by step until the V_CELL_FB is not less than the V_CELL_REF.

To re-set V_SET step by step, a difference between the V_CELL_REF and the V_CELL_FB may be added to the V_SET, or a difference between the V_CELL_REF and the V_CELL_FB and a certain voltage X may be added to the V_SET. This may be expressed by Equation (1) as follows:

$$V\_SET = V\_SET + (V\_CELL\_REF - V\_CELL\_FB), \text{ or}$$
$$V\_SET = V\_SET + (V\_CELL\_REF - V\_CELL\_FB) + X. \quad (1)$$

If the result of step 330 indicates that V_CELL_FB is greater than V_CELL_REF, the control unit 150 re-sets I_SET to ensure safety in step 350. Resetting I_SET decreases I_SET step by step until the V_CELL_FB is less than V_CELL_REF.

In step 360, the control unit 150 determines whether V_CELL_FB is greater than V_CELL_REF.

If V_CELL_FB is less than the V_CELL_REF, according to whether a charging end condition is detected in step 370, the control unit 150 ends charging the battery unit 130 in step 380.

As such, if charging is performed by compensating V_SET at a point where V_CELL is low in order to compensate a voltage drop caused by an ESR, the V_CELL is increased. In this case, V_CELL_REF may be a pre-set value as a maximum voltage limit of V_SET to prevent V_CELL from reaching the voltage limit at which there is a risk of a battery explosion or a malfunction.

Figure 8:
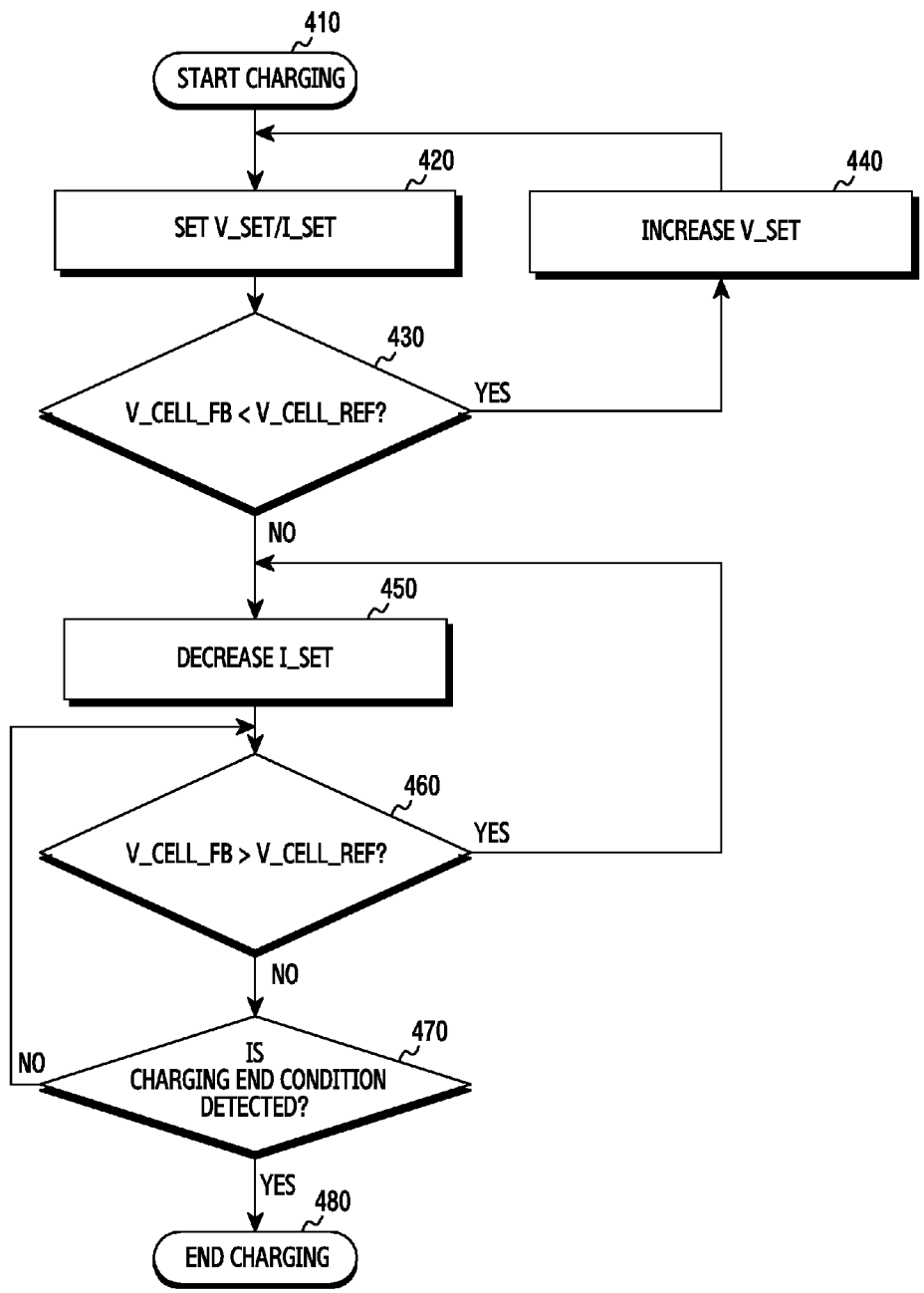
FIG. 8 is a flowchart of a charging method according to an embodiment of the present disclosure.

FIG. 8 is a flowchart of a charging method according to an embodiment of the present disclosure. The flowchart of FIG. 8 is the same as the flowchart of FIG. 7, except that V_SET is decreased in step 450 of FIG. 8 instead of I_SET decreasing in step 350 of FIG. 7.

Referring to FIG. 8, the control unit 150 starts charging the battery unit 130 in step 410, and sets V_SET and I_SET in association with the charging of the battery unit 130 in step 420. In this case, V_SET_DESIGN may be set. For example, if a charging voltage per battery cell is 4.35V, if two or three or four battery cells are coupled to each other in series, the V_SET_DESIGN is set to 8.7V/13.05V/17.4V, respectively.

In step 430, the control unit 150 determines whether V_CELL_FB is less than V_CELL_REF.

If V_CELL_FB is less than the V_CELL_REF, the control unit 150 re-sets the V_SET in step 440. Re-setting V_SET increases V_SET step by step until V_CELL_FB is reaches V_CELL_REF.

To re-set V_SET step by step, a difference between the V_CELL_REF and the V_CELL_FB may be added to the V_SET, or a difference between the V_CELL_REF and the V_CELL_FB and specific voltage X may be added to the V_SET. This is expressed by Equation (1) above as.

If the result of decision in step 430 indicates that V_CELL_FB is greater than the V_CELL_REF, the control unit 150 re-sets I_SET to ensure safety in step 450. Re-setting I_SET decreases I_SET step by step until V_CELL_FB is less than the V_CELL_REF.

In step 460, the control unit 150 determines whether V_CELL_FB is greater than V_CELL_REF.

If V_CELL_FB is less than V_CELL_REF, according to whether a charging end condition is detected in step 470, the control unit 150 ends charging the battery unit 130 in step 480.

Figure 9:
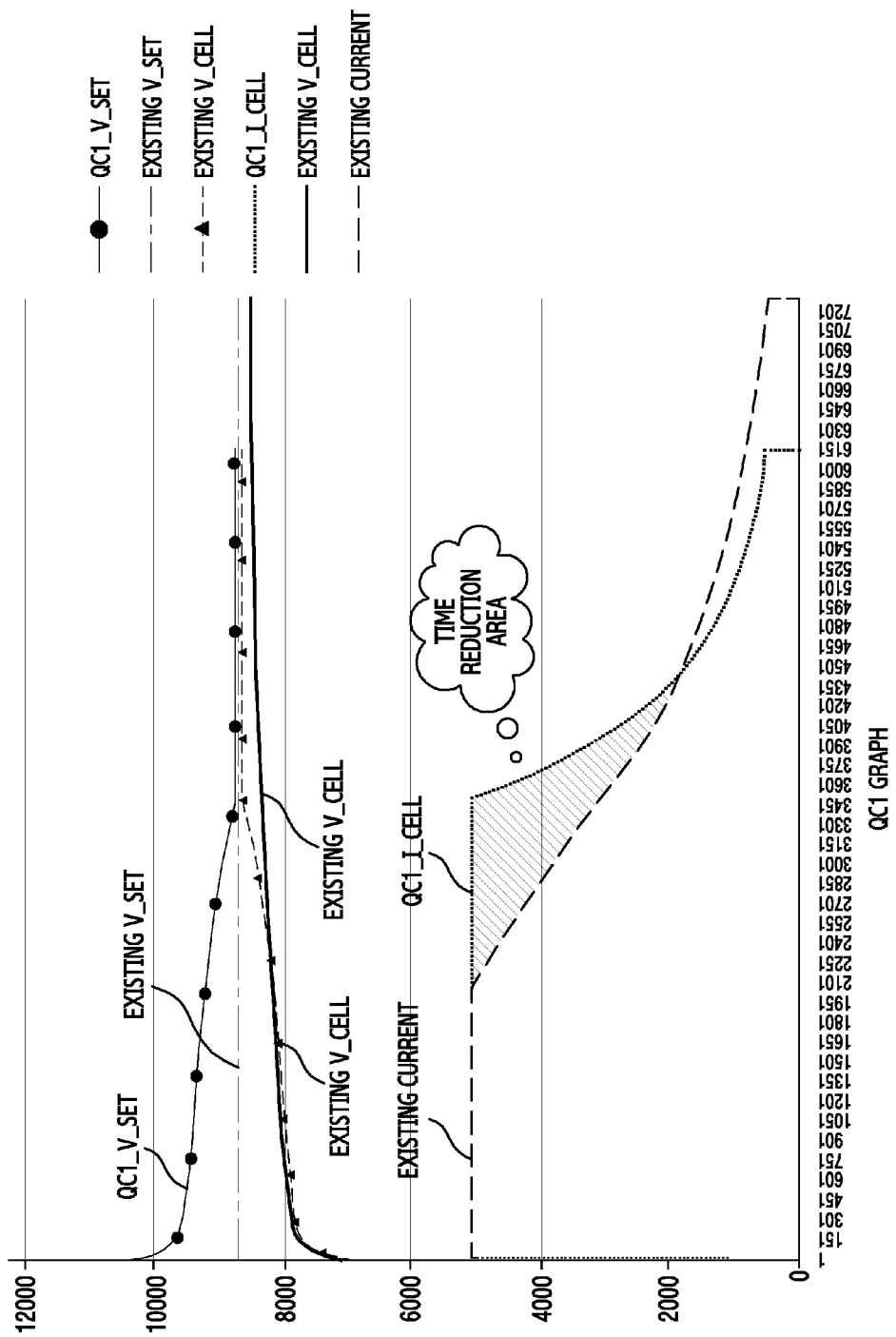
FIG. 9 is a graph indicating a battery charging state over time according to the method of FIG. 7.

Table 3 below illustrates an example of voltage/current values applicable to the QC1, and FIG. 9 is a graph indicating a battery charging state over time according to the method of FIG. 7 (e.g. QC1).

TABLE 3

| Item | Value |
|---|---|
| V_SET/I_SET | 8700 mV/4032 mA |
| V_SET_DESIGN/I_SET_DESIGN | 8700 mV/4032 mA |
| V_SET | V_SET + (V_CELL_REF − V_CELL_FB) + X |
| Current Step | 16 mA |
| Voltage Step | 16 mV |
| V_CELL_FB | Cell1 + . . . + Cell4 |
| V_CELL_REF | 8700 mV |

Referring to Table 3 above and FIG. 9, (e.g. QC1), the control unit 150 performs charging by compensating for a difference between V_CELL_FB and V_CELL_REF at V_SET while monitoring V_CELL_FB to compensate for a voltage drop caused by the ESR.

In this case, since a CC region increases unlike in a conventional battery charging scheme, V_CELL increases rapidly to V_SET_DESIGN, and a time and a charging amount may be ensured with a reduction in time as compared to a conventional method.

As such, if V_CELL exceeds 8700 mV (e.g. 8.7V) which is a peak reference voltage while performing charging by compensating V_SET at a point where V_CELL is low, there is a risk of battery explosion or malfunction. Therefore, the control unit 150 pre-confirms V_SET at which V_CELL is increased up to 8700 mV which is V_SET_DESIGN, and pre-configures 8700 mV which is V_CELL_REF so that V_SET is not increased to greater than or equal to the pre-confirmed value.

Until it is detected that V_CELL_FB is not greater than 8700 mV which is the V_CELL_REF, the control unit 150 performs charging by decreasing I_SET step by step by 16 mA steps, or performs charging by decreasing V_SET step by step by 16 mV steps.

Figure 10:
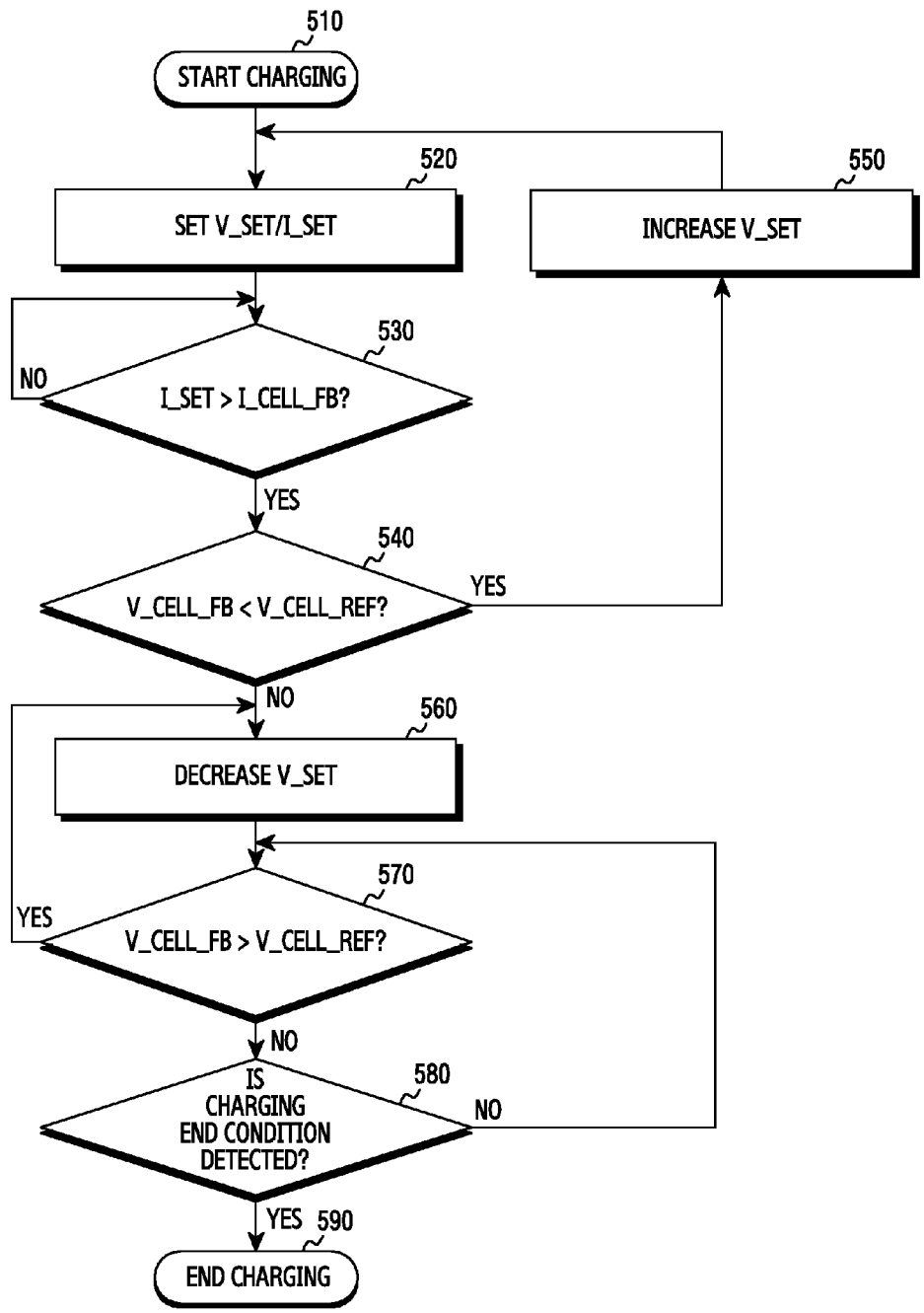
FIG. 10 is a flowchart of a charging method according to an embodiment of the present disclosure.

FIG. 10 is a flowchart of a charging method according to an embodiment of the present disclosure (e.g.QC2).

Referring to FIG. 10, the control unit 150 starts charging the battery unit 130 in step 510, and sets V_SET and I_SET in association with the charging of the battery unit 130 in step 520. In this case, V_SET and I_SET may be set respectively as V_SET_DESIGN and I_SET_DESIGN.

In step 530, the control unit 150 monitors I_CELL_FB to determine whether it is less than I_SET.

If I_CELL_FB is less than I_SET, the control unit 150 determines whether V_CELL_FB is greater than V_CELL_REF in step 540.

If V_CELL_FB is less than V_CELL_REF, in step 550, V_SET is re-set, where V_SET is increased step by step.

In this case, re-setting V_SET step by step is repetitively performed until I_CELL_FB is lower than I_SET and V_CELL_FB is not lower than the V_CELL_REF (e.g. V_SET=V_SET+α, where, I_CELL_FB<I_SET AND V_CELL_FB<V_CELL_REF).

If V_CELL_FB is greater than V_CELL_REF in step 540, the control unit 150 decreases V_SET by a voltage β in step 560.

In step 570, the control unit 150 determines whether V_CELL_FB is greater than V_CELL_REF.

If V_CELL_FB is greater than V_CELL_REF, the method returns to step 560, where the control unit 150 decreases V_SET by the voltage β.

That is, by decreasing V_SET by the voltage β step by step through steps 560 and 570, an explosion of the battery unit 130 or a malfunction caused by overvoltage may be avoided during battery charging. Steps 560 and 570 are repetitively performed until V_CELL_FB is not greater than V_CELL_REF.

If V_CELL_FB is not greater than V_CELL_REF in step 570, a charging end condition is detected in step 580 and thus charging of the battery unit 130 ends in step 590.

In this case, V_CELL_REF may be a pre-set value determined such that V_SET is not increased to be greater than or equal to the pre-confirmed V_SET at which V_CELL is increased to up to V_SET_DESIGN during charging while increasing V_SET to a point at which I_CELL is decreased. This is to avoid an explosion or malfunction caused by overvoltage of the battery unit 130.

Figure 11:
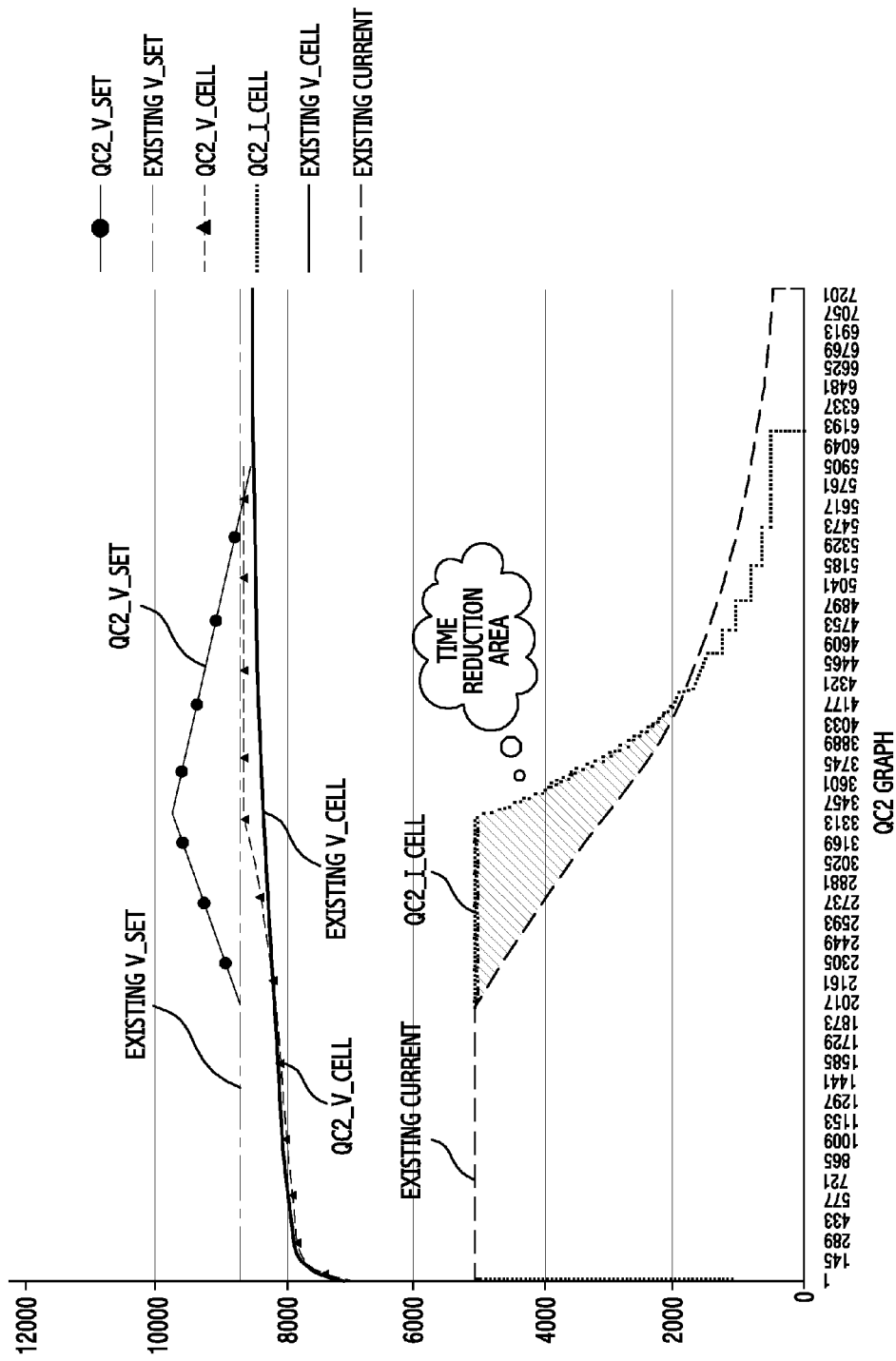
FIG. 11 is a graph indicating a battery charging state over time according to the method of FIG. 10.

Table 4 below illustrates an example of voltage/current values applicable to QC2, and FIG. 11 is a graph illustrating a battery charging state over time according to the method of FIG. 10 (e.g. QC2).

TABLE 4

| Item | Value |
|---|---|
| V_SET/I_SET | 8700 mV/4032 mA |
| V_SET_DESIGN/I_SET_DESIGN | 8700 mV/4032 mA |
| Voltage Step | 16 mV |
| V_CELL_FB | Cell1 + . . . + Cell4 |
| V_CELL_REF | 8700 mV |

Referring to Table 4 and FIG. 11, (e.g. QC2), the control unit 150 performs charging by increasing V_SET step by step to a point at which I_CELL_FB is decreased or to a point at which I_CELL_FB is decreased to be less than I_SET by a certain value while continuously monitoring I_CELL_FB to compensate for a voltage drop caused by an ESR.

In this case, since a CC region increases unlike a conventional battery charging scheme, V_CELL increases rapidly to V_SET_DESIGN, and a time and a charging amount can be ensured with a reduction in time as compared to the conventional method.

As such, if V_CELL exceeds 8700 mV which is a peak reference voltage while performing charging by increasing V_SET to a point where I_CELL_FB is decreased, there is a risk of a battery explosion or a malfunction. Therefore, the control unit 150 pre-confirms V_SET at which V_CELL is increased to 8700 mV, which is V_SET_DESIGN, and pre-configures 8700 mV, which is V_CELL_REF, so that V_SET is not increased to be greater than or equal to the pre-confirmed value.

Until it is detected that V_CELL_FB does not exceed 8700 mV, which is V_CELL_REF, the control unit 150 performs charging by decreasing V_SET by step by step by 16 mV steps.

In summary, the operation of increasing or decreasing V_SET step by step according to an embodiment of the present disclosure (e.g. QC2) may be selected according to the following conditions.

Operation of increasing V_SET: V_SET=V_SET+16 mV($\alpha$) (where I_CELL_FB<I_SET AND V_CELL_FB<V_CELL_REF)

Operation of decreasing V_SET: V_SET=V_SET−16 mV($\beta$) (where V_CELL_FB>V_CELL_FB)

In the case of using a charging scheme of QC2, since V_SET is changed only at a time at which I_CELL is decreased, unlike in QC1, V_SET is not set to an unnecessarily high voltage in a region where a charging amount of V_CELL is low, and only an ESR voltage drop portion can be accurately compensated in a CC control region.

In addition, a system using an adapter in an electronic device may include a case where power is used from a battery or other devices in a charging system and a case where I_CELL does not reach a reference value of I_SET. In this case, I_SET of the charger must be designated again by comparing power used in an adapter battery system or the like.

Figure 12:
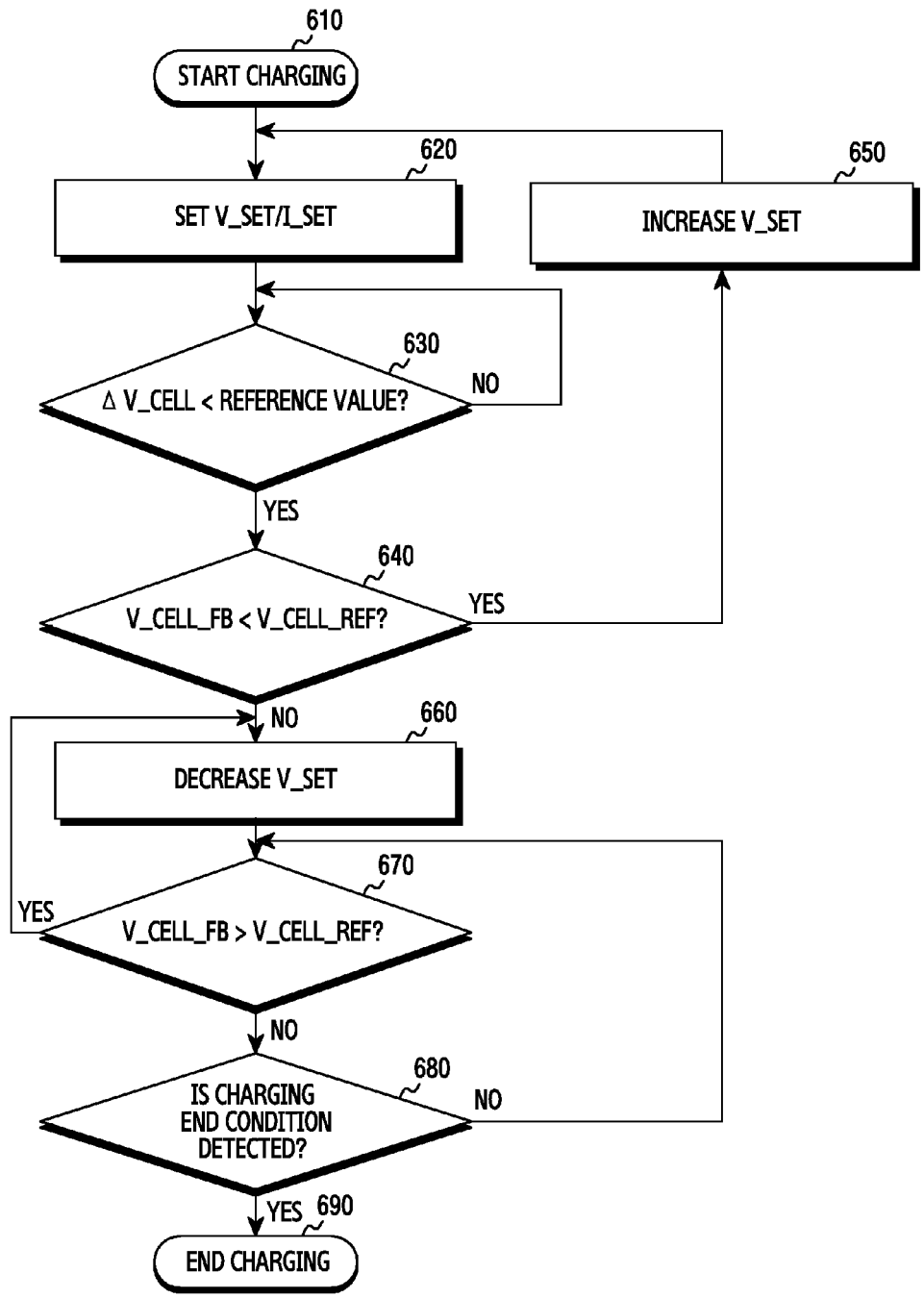
FIG. 12 is a flowchart of a charging method according to an embodiment of the present disclosure.

FIG. 12 is a flowchart of a charging method according to an embodiment of the present disclosure (e.g. QC3).

Referring to FIG. 12, the control unit 150 starts charging the battery unit 130 in step 610, and sets V_SET and I_SET in association with the charging of the battery 130 in step 620. In this case, V_SET and I_SET may be set respectively as V_SET_DESIGN and I_SET_DESIGN.

In step 630, the control unit 150 decides whether $\Delta$V_CELL, which is an inclination of battery cell voltage, is less than a pre-set reference value. Alternatively, a point at which $\Delta$V_CELL is decreased may be detected. This is because $\Delta$V_CELL is constant in a CC region in which constant current flows.

Alternatively, $\Delta$V_CELL may include an error depending on a charging current variation. Therefore, the error may be decreased by additionally applying a portion of performing an integral operation on $\Delta$V_CELL and comparing the result to a pre-set reference value. This can be expressed by $\int$V_CELL(t)−V_CELL(t−1)<X.

If $\Delta$V_CELL is less than a pre-set reference value, in step 640, it is determined whether V_CELL_FB is less than V_CELL_REF.

If V_CELL_FB is less than V_CELL_REF in step 650, V_SET is re-set so that V_SET is increased step by step.

In this case, re-setting V_SET step by step is repetitively performed if $\Delta$V_CELL is less than a pre-set reference value and V_CELL_FB is less than V_CELL_REF (V_SET=V_SET+$\alpha$, where, $\Delta$V_CELL<reference value AND V_CELL_FB<V_CELL_REF).

If V_CELL_FB is greater than V_CELL_REF in 640, the control unit 150 decreases V_SET by a voltage $\beta$ in step 660.

In step 670, the control unit 150 determines whether V_CELL_FB is greater than V_CELL_REF.

If V_CELL_FB is greater than V_CELL_REF, the method returns to step 660, where the control unit 150 decreases V_SET by the voltage $\beta$.

That is, by decreasing V_SET by the voltage $\beta$ step by step through steps 660 and 670, an explosion or malfunction caused by overvoltage may be avoided during battery charging. The steps 660 and 670 are repetitively performed until V_CELL_FB is not less than V_CELL_REF.

If V_CELL_FB is not greater than V_CELL_REF in step 670, a charging end condition is detected in step 680 and thus charging of the battery unit 130 ends in step 690.

In this case, V_CELL_REF may be a pre-set value determined such that V_SET is not increased to be greater than or equal to the pre-confirmed V_SET at which V_CELL is increased to V_SET_DESIGN during charging while increasing V_SET to a point at which $\Delta$V_CELL is decreased. This is to avoid an explosion or malfunction caused by overvoltage of the battery unit 130.

Figure 13:
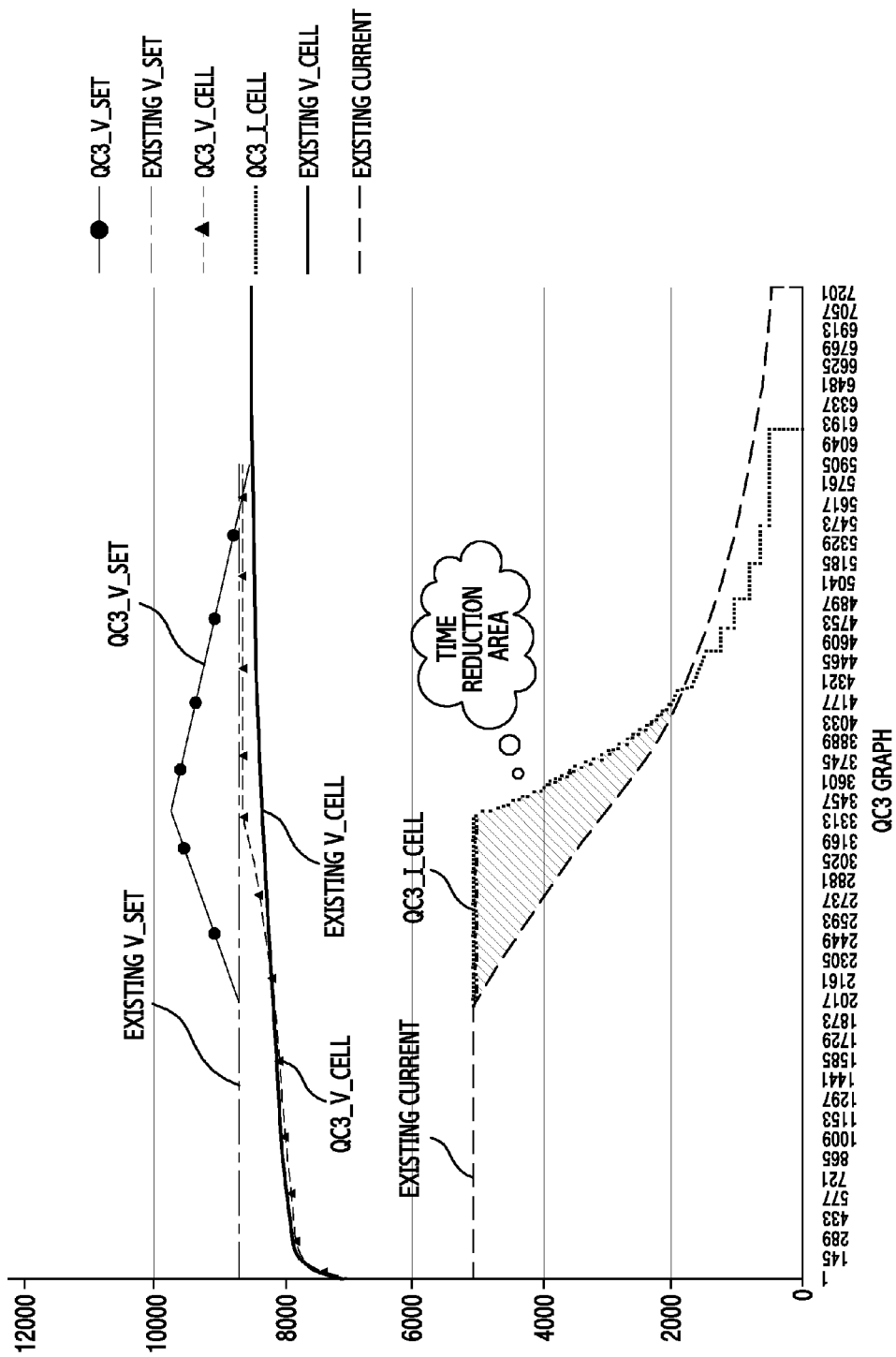
FIG. 13 is a graph indicating a battery charging state over time according to the method of FIG. 12.

Table 5 below illustrates an example of voltage/current values applicable to an embodiment of the present disclosure (e.g. QC3), and FIG. 13 is a graph indicating a battery charging state over time according to the method of FIG. 12 (e.g. QC3).

TABLE 5

| Item | Value |
|---|---|
| V_SET/I_SET | 8700 mV/4032 mA |
| V_SET_DESIGN/I_SET_DESIGN | 8700 mV/4032 mA |
| Voltage Step | 16 mV |
| V_CELL | Cell1 + . . . + Cell4 |
| V_CELL_REF | 8700 mV |

Referring to Table 5 and FIG. 13, (e.g. QC3), the control unit 150 performs charging by increasing V_SET step by step if $\Delta$V_CELL is less than a reference value or if $\Delta$V_CELL is low while continuously monitoring $\Delta$V_CELL to compensate for a voltage drop caused by an ESR.

In this case, since a CC region increases unlike in a conventional battery charging scheme, V_CELL increases rapidly to V_SET_DESIGN, and a time and a charging amount can be ensured with a reduction in time as compared to a conventional method.

As such, if V_CELL exceeds 8700 mV, which is a peak reference voltage, while performing charging by increasing V_SET to a point where $\Delta$V_CELL is decreased, there is a risk of a battery explosion or malfunction. Therefore, the control unit 150 pre-confirms V_SET at which V_CELL is increased to 8700 mV, which is V_SET_DESIGN, and pre-configures 8700 mV, which is V_CELL_REF, so that V_SET is not increased to be greater than or equal to the pre-confirmed value.

Until it is detected that V_CELL_FB does not exceed 8700 mV, which is V_CELL_REF, the control unit 150 performs charging by decreasing V_SET step by step by 16 mV steps.

In summary, the operation of increasing or decreasing V_SET step by step according to an embodiment of the present disclosure (e.g. QC3) may be selected according to the following conditions.

Operation of increasing V_SET: V_SET=V_SET+16 mV(α) (where ΔV_CELL<reference AND V_CELL_FB<V_CELL_REF)

Operation of decreasing V_SET: V_SET=V_SET−16 mV(β) (where V_CELL_FB>V_CELL_FB)

Figure 14:
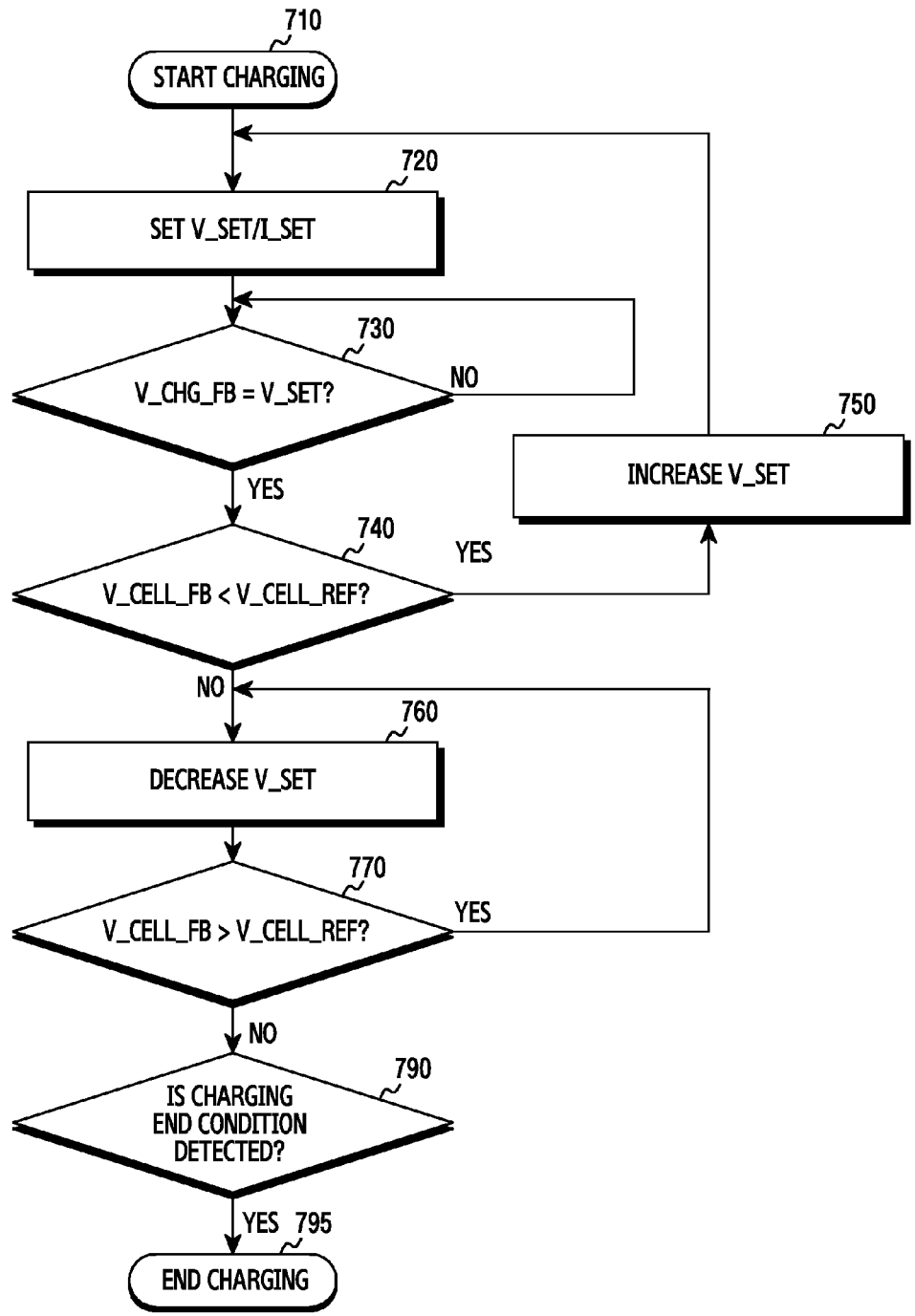
FIG. 14 is a flowchart illustrating a charging process according to an embodiment of the present disclosure.

FIG. 14 is a flowchart of a charging method according an embodiment of the present disclosure (e.g. QC4).

Referring to FIG. 14, the control unit 150 starts charging the battery unit 130 in step 710, and sets V_SET and I_SET in association with the charging of the battery unit 130 in step 720. In this case, V_SET and I_SET may be set respectively as V_SET_DESIGN and I_SET_DESIGN.

In step 730, the control unit 150 determines whether V_CHG_FB is equal to V_SET. In this case, the control unit 150 may receive V_CHG in a feedback manner by using an analog to digital converter (ADC).

If V_CHG_FB is equal to V_SET, in 740 and 750, the control unit 150 increases V_SET step by step until V_CELL_FB does not exceed V_CELL_REF. Re-setting V_SET step by step is repetitively performed until the V_CELL_FB is not lower than V_CELL_REF. Accordingly, QC4 can decrease a charging time by extending a CC region.

If V_CELL_FB is greater than V_CELL_REF in step 740, the control unit 150 decreases V_SET by a pre-set voltage to ensure safety in step 760.

In step 770, the control unit 150 decreases I_SET step by step until V_CELL_FB does not exceed V_CELL_REF.

If V_CELL_FB is not greater than V_CELL_REF in step 740, a charging end condition is detected in step 790 and thus charging of the battery unit 130 ends in step 795.

In this case, V_CELL_REF may be a pre-set value determined such that V_SET is not increased to be greater than or equal to the pre-confirmed V_SET at which V_CELL is increased to V_SET_DESIGN during charging while increasing V_SET when V_CHG is equal to V_SET and V_CELL_FB does not exceed V_CELL_REF. This is to avoid an explosion or malfunction caused by overvoltage of the battery unit 130.

Figure 15:
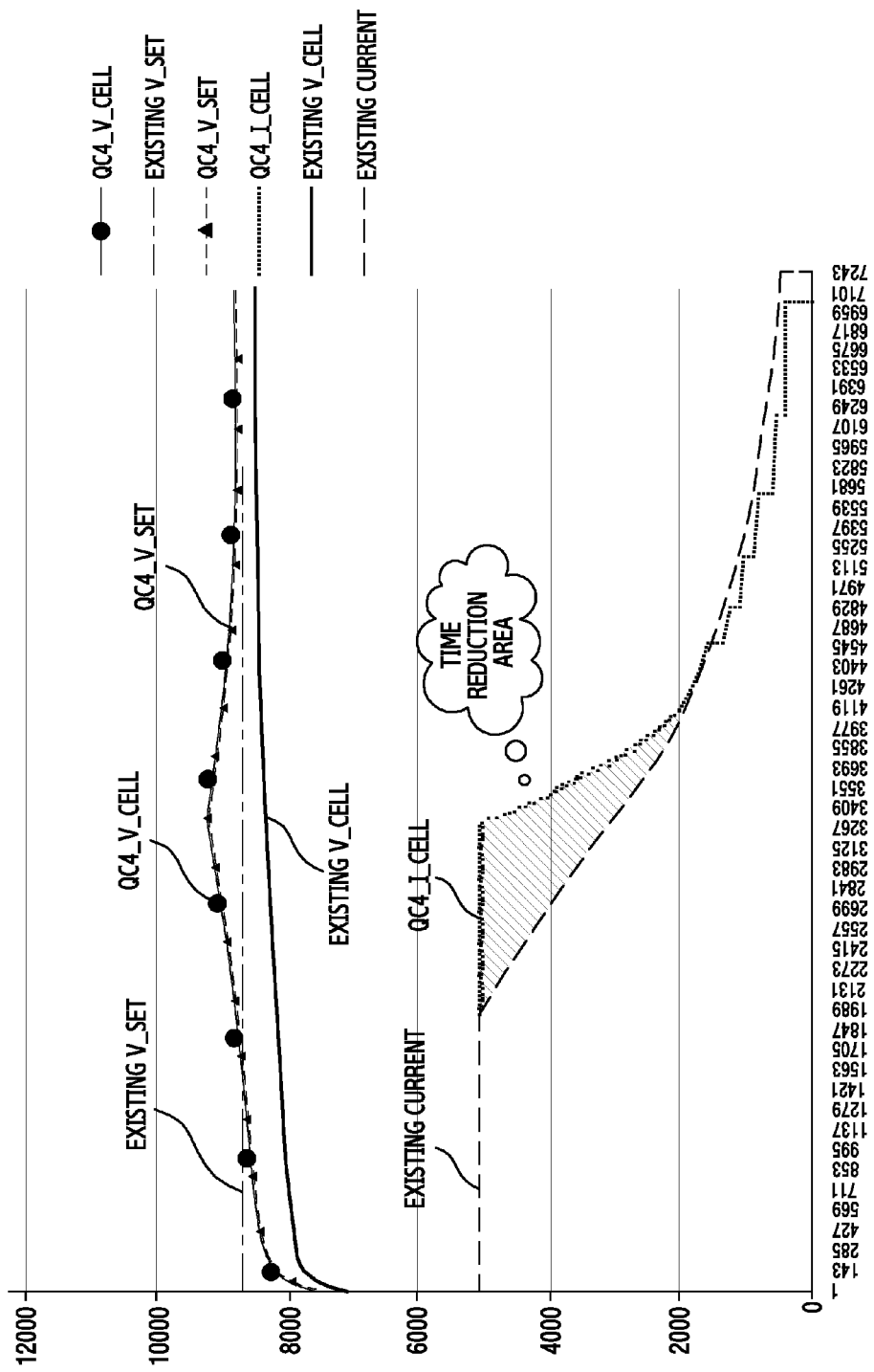
FIG. 15 is a graph indicating a battery charging state over time according to the method of FIG. 14.

Table 6 below illustrates an example of voltage/current values applicable to QC4, and FIG. 15 is a graph indicating a battery charging state over time according to the method of FIG. 14 (e.g. QC4).

TABLE 6

| Item | Value |
|------|-------|
| V_SET/I_SET | 8700 mV/4096 mA |
| V_SET_DESIGN/I_SET_DESIGN | 8700 mV/4032 mA |
| Voltage Step | 16 mV |
| V_CELL | Cell1 + . . . + Cell4 |
| V_CELL_REF | 8700 mV |

Referring to Table 6 above and FIG. 15, in order to compensate for a voltage drop caused by an ESR, the control unit 150 may compare V_CHG with V_SET, and if the two values are identical to each other, may extend a CC region by increasing V_SET step by step. Since V_CHG is low in the CC region in which constant current flows, a CC control is achieved in this region. Therefore, V_CHG is less than V_SET. While charging is performed, V_CHG becomes equal to V_SET, and at this time, a mode change is made to a constant voltage (CV) mode. Therefore, an effect of extending a CC region can be implemented by increasing V_SET step by step.

In this case, since the CC region increases unlike in a conventional battery charging scheme, V_CELL increases rapidly to V_SET_DESIGN, and a time and a charging amount can be ensured with a reduction in time as compared to a conventional method.

As such, if V_CELL exceeds 8700 mV, which is a peak reference voltage, while performing charging by increasing V_SET, there is a risk of a battery explosion or a malfunction. Therefore, the control unit 150 pre-confirms V_SET at which V_CELL is increased to 8700 mV which is V_SET_DESIGN, and pre-configures 8700 mV, which is V_CELL_REF so that V_SET is not increased to be greater than or equal to the pre-confirmed value.

Until it is detected that the V_CELL_FB does not exceed 8700 mV, which is V_CELL_REF, the control unit 150 performs charging by decreasing V_SET step by step by 16 mV steps.

In summary, the operation of increasing or decreasing V_SET step by step according to QC4 may be selected according to the following conditions.

Operation of increasing V_SET: V_SET=V_SET+16 mV (where V_SET=V_CHG AND V_CELL_FB<V_CELL_REF)

Operation of decreasing V_SET: V_SET=V_SET−16 mV (where V_CELL_FB>V_CELL_REF)

In addition, although the operation of increasing V_SET is performed if V_CHG is equal to V_SET in QC4, battery voltage is high, and thus a voltage divider circuit may be used in a control unit (i.e., MICOM) in which a maximum voltage of an ADC is less than the battery voltage. In addition, if a divided voltage is used, leakage current is generated during charging or discharging and thus efficiency deteriorates. Therefore, an additional switch is preferably used to use a function of QC4 only during charging.

In this case, the aforementioned part is implemented with a circuit of FIG. 6. Resistors R3 and R4 divide V_CHG to convert it into a digital value in the control unit 150 by using an ADC function. A first transistor Q1 plays a role of a switch to be used only during charging in order to avoid leakage current during charging. R1, R2, and Q2 are additional circuits added to turn off and on (e.g. open and close) Q1 by providing a signal in the control unit 150.

Figure 16:
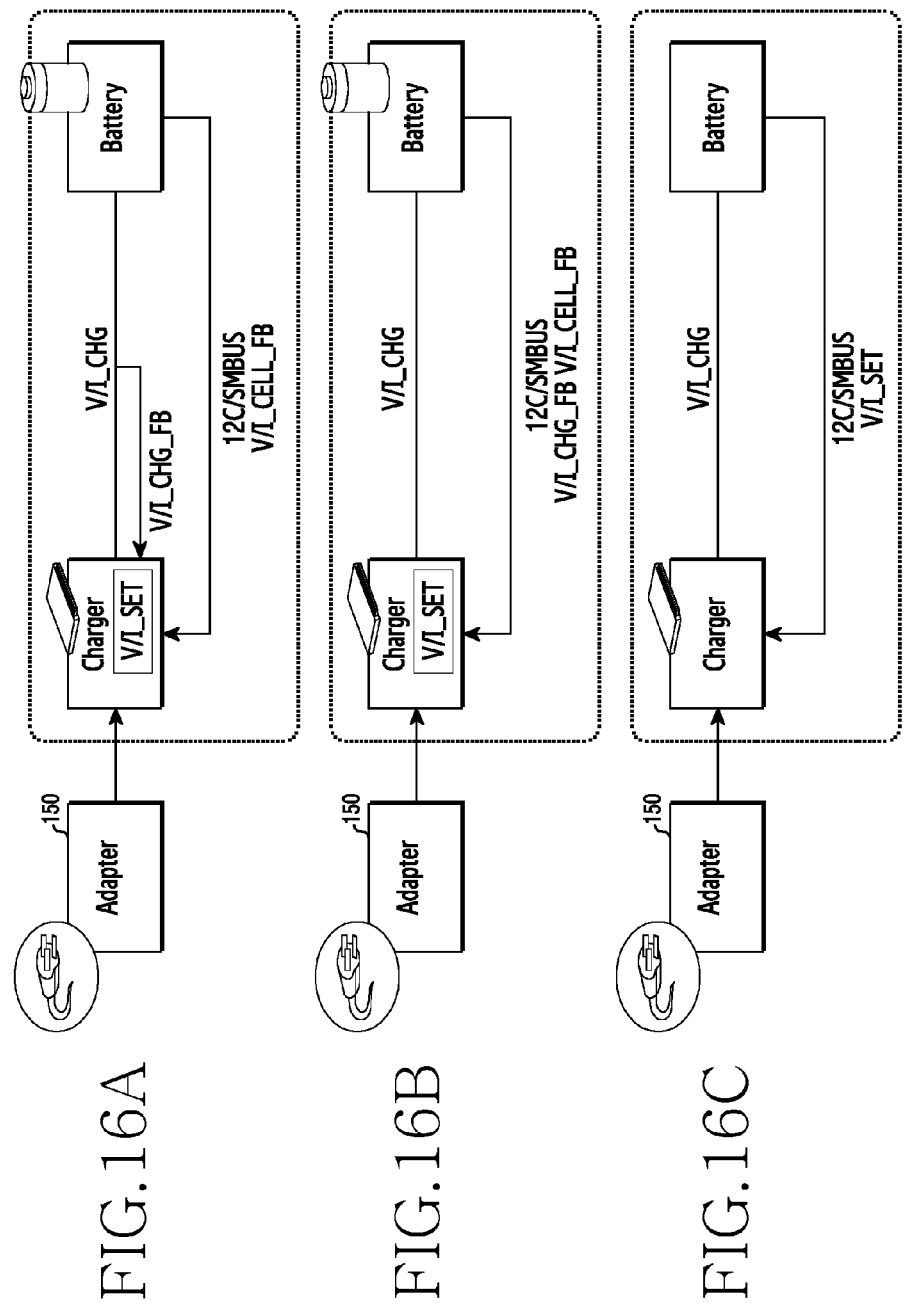
FIGS. 16A to 16C are block diagrams of a battery charging equipment according to embodiments of the present disclosure.

FIGS. 16A to 16C are block diagrams of a battery charging equipment according to embodiments of the present disclosure. The aforementioned device of controlling battery charging according to an embodiment of the present disclosure illustrated in FIG. 6 is described by taking a configuration in which the control unit 150 is separated from the charger unit 110 and the battery unit 130. In contrast, in a device of controlling battery charging illustrated in FIG. 16, a role of a control unit is played by the charger unit 110 or the battery unit 130, and thus a configuration may be changed as shown in FIGS. 16A to 16C.

FIG. 16A is a block diagram in which a charger receives V_CHG_FB and I_CHG_FB in a feedback manner from an output node of the charger, and receives V_CELL_FB and I_CELL_FB required in an arithmetic operation from the battery in a feedback manner, and autonomously sets V_SET and I_SET.

FIG. 16B is a block diagram in which a battery delivers V_CHG_FB, I_CHG_FB, V_CELL_FB, and I_CELL_FB to the charger (e.g. charger unit 110), and the charger sets V_SET and I_SET.

FIG. 16C is a in which a battery monitors V_CHG_FB, I_CHG_FB, V_CELL_FB, and I_CELL_FB, and sets V_SET and I_SET.

Figure 17:
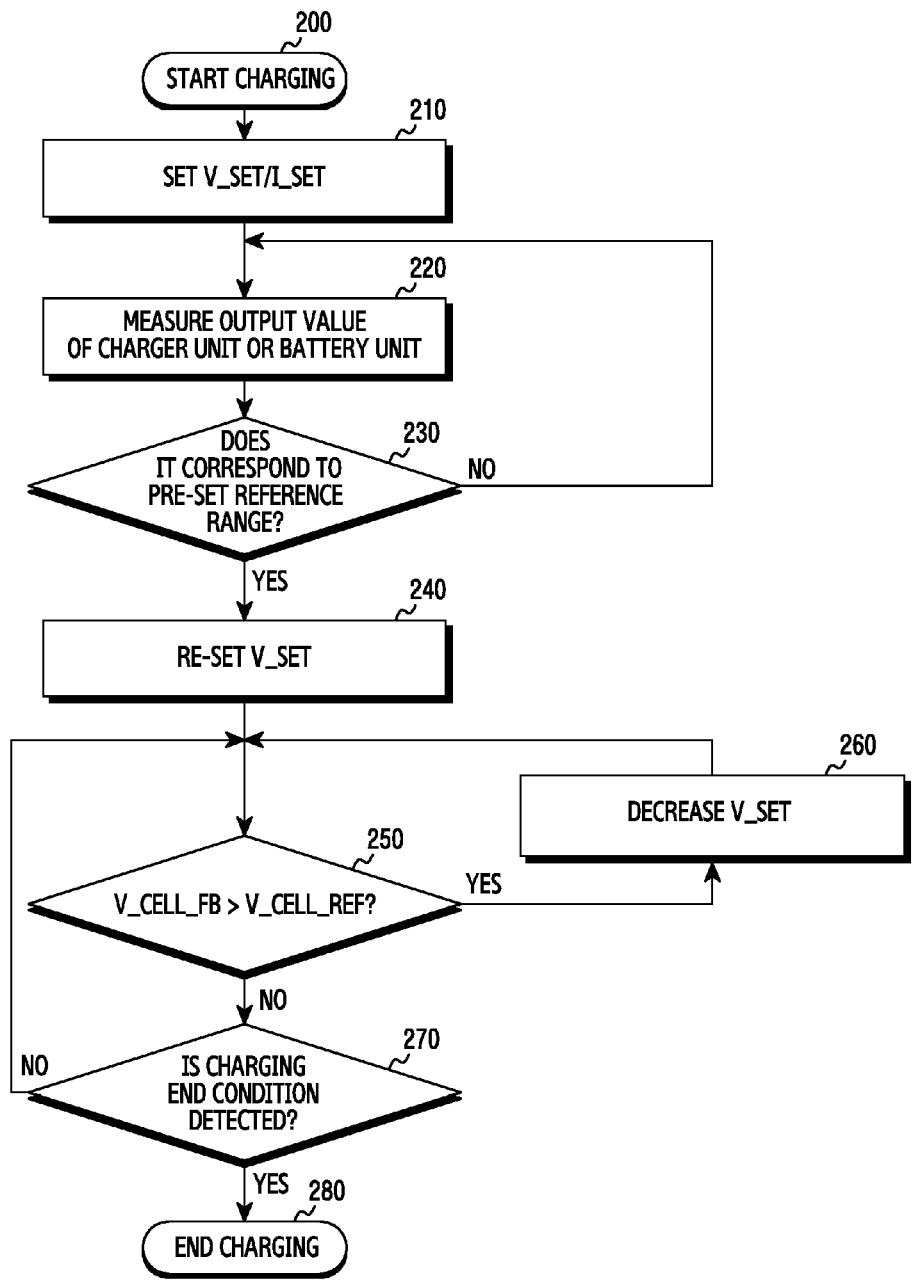
FIG. 17 is a flowchart of a charging method according to an embodiment of the present disclosure.

FIG. 17 is a flowchart of a charging method of the electronic device 100 according to an exemplary embodiment of the present disclosure.

The control unit 150 starts charging the battery unit 130 in step 200, and sets V_SET and I_SET in association with the charging of the battery unit 130 in step 210.

In step 220, an output value of the battery unit 130 or the charger unit 110 is measured during charging. The output value may be a current or a voltage.

In step 230, it is determined whether the measured output value corresponds to a pre-set reference range. The pre-set reference range may be any one of a case where V_CELL_FB is less than V_CELL_REF, I_CELL_FB is less than I_SET V_CELL_FB is less than V_CELL_REF ΔV_CELL is less than a pre-set reference value, V_CELL_FB is less than V_CELL_REF, V_CHG_FB is equal to V_SET, and V_CELL_FB is less than V_CELL_REF.

In step 240, if the output value corresponds to the pre-set reference value, V_SET is re-set. That is, in order to compensate for a voltage drop caused by an ESR, V_SET initially set in step 210 is re-set to be greater by a certain voltage. In this case, V_SET may be increased by the certain voltage step by step. In this case, since a CC region increases, unlike in a conventional charging scheme, V_CELL is rapidly increased to V_SET_DESIGN, and thus a time and a charging amount are ensured with a reduction in time.

In step 250, it is determined whether V_CELL_FB is greater than V_CELL_REF.

If V_CELL_FB is greater than V_CELL_REF, in step 260, V_SET is decreased step by step until V_CELL_FB is not greater than V_CELL_REF.

If it is determined in step 250 that V_CELL_FB is less than V_CELL_REF, according to whether a charging end condition is detected in step 270, the control unit 150 ends the charging of the battery unit 130 in step 280.

If it is determined in step 270 that the charging end condition is not detected, the control unit 150 returns to the step 250.

In steps 250 and 260, V_CELL_REF is set for safety, and if V_CELL_FB exceeds V_CELL_REF, V_SET may be decreased step by step, or is decreased to V_SET_DESIGN, so that V_CELL does not exceed V_CELL_REF.

Figure 18:
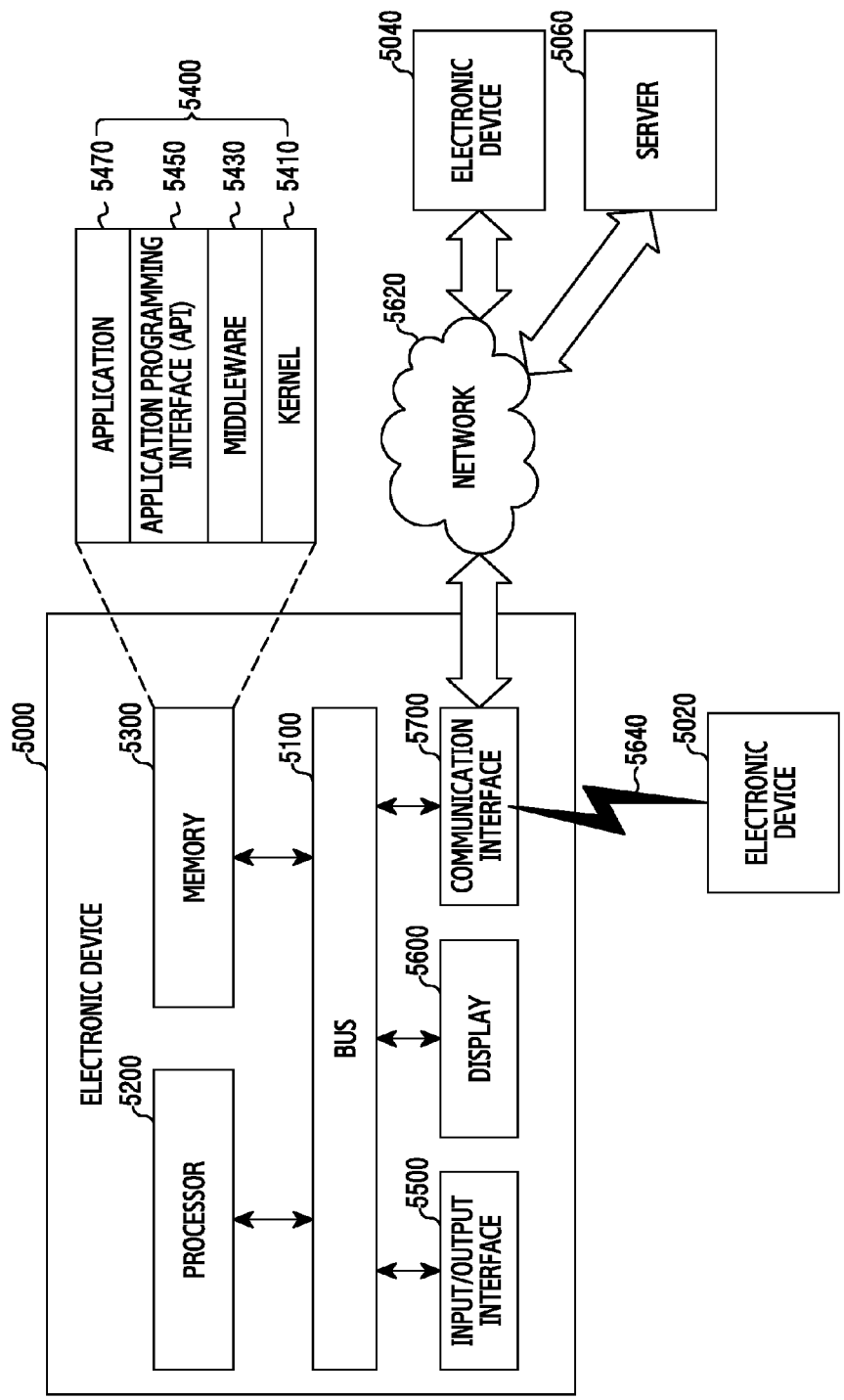
FIG. 18 is a block diagram of an electronic device according to an embodiment of the present disclosure.

FIG. 18 is a block diagram of an electronic device 5000 according to an embodiment of the present disclosure.

Referring to FIG. 18, the electronic device 5000 may include a bus 5100, a processor 5200, a memory 5300, an input/output interface 5500, a display 5600, and a communication interface 5700. According to various embodiments of the present disclosure, at least one of the components of the electronic device 5000 may be omitted, or other components may be additionally included in the electronic device 5000. The bus 5100 may be a circuit that connects the processor 5200, the memory 5300, the input/output interface 5500, the display 5600, or the communication interface 5700 and transmits a communication (for example, a control message) between the above described components.

The processor 5200 may construct a web page for display on the display 5600 using a web page document stored in the memory 5300 or provided from an external device (e.g., a first external electronic device 5020, a second external electronic device 5040, or a server 5060) through the communication interface 5700. For example, the processor 5200 may parse the web page document (e.g., HTML document) to create a document object model (DOM) tree for tags constructing the web page. The processor 5200 may parse a style element of the web page to create a render tree. The processor 5200 may control the display 5600 to display the web page through rendering using the render tree.

According to an embodiment of the present disclosure, if detecting an input for selection of at least a partial area of a web page through the input/output interface 5500, the processor 5200 may insert an attribute variable (e.g., a tag) for selecting and displaying to a DOM tree for the area where the input is detected.

According to an embodiment of the present disclosure, if detecting an input for selection of at least a partial area of a web page through the input/output interface 5500, the processor 5200 may control to update a render tree and display the area where the input is detected. To display the selection of a plurality of areas, the processor 5200 may insert an attribute variable (e.g., a tag) for selecting and displaying to a DOM tree for the area where the input is detected.

According to an embodiment of the present disclosure, the processor 5200 may store web page construction information (e.g., HTML information of an area where an input is detected) in a selection control module. For example, the processor 5200 may store an attribute variable (e.g., a tag) for selecting and displaying and web page construction information in the selection control module. For instance, the selection control module may exist in at least one position of the internal or external of a web engine which consists of software constructing and driving a web page.

According to an embodiment of the present disclosure, the processor 5200 may extract web page construction information of at least one selected area, and construct a show page. For example, the processor 5200 may search a DOM tree for an attribute variable for selecting and displaying, and identify at least one selected area. The processor 5200 may extract the web page construction information of the at least one selected area, and create the show page. For example, the processor 5200 may use the web page construction information of the at least one selected area stored in the selection control module, and create the show page. For instance, the show page may represent separate contents constructed to include at least a part of the web page construction information of the at least one area such that a user can identify the web page construction information of the at least one area selected by the user. The show page may include an electronic document including display data (e.g., image data, text data) included in at least one selected area, or a HTML-type document including HTML information (e.g., a tag, a script) included in the at least one selected area.

According to an embodiment of the present disclosure, the processor 5200 may reconstruct a web page to hide the displaying of at least one selected area on the web page displayed on the display 5600.

The memory 5300 may include a volatile memory and/or a non-volatile memory. The memory 5300 may store, for example, instructions or data (e.g. image data) relevant to at least one other element of the electronic device 5000. According to an embodiment of the present disclosure, the memory 5300 may store software and/or a program 5400. The program 5400 may include, for example, a kernel 5410, middleware 5430, an application programming interface (API) 5450, and/or an application program (or "applications") 5470. At least some of the kernel 5410, the middleware 5430, and the API 5450 may be referred to as an operating system (OS).

The kernel 5410 may control or manage system resources (e.g., the bus 5100, the processor 5200, or the memory 5300) used for performing an operation or function implemented by the other programs (e.g., the middleware 5430, the API 5450, or the application programs 5470). Furthermore, the kernel 5410 may provide an interface through which the middleware 5430, the API 5450, or the application programs 5470 may access the individual elements of the electronic device 5000 to control or manage the system resources.

The middleware 5430, for example, may function as an intermediary for allowing the API 5450 or the application programs 5470 to communicate with the kernel 5410 to exchange data.

In addition, the middleware 5430 may process one or more task requests received from the application programs 5470 according to priorities thereof. For example, the middleware 5430 may assign priorities for using the system resources (e.g., the bus 5100, the processor 5200, the memory 5300, or the like) of the electronic device 5000, to at least one of the application programs 5470. For example, the middleware 5430 may perform scheduling or loading balancing on the one or more task requests by processing the one or more task requests according to the priorities assigned thereto.

The API 5450 is an interface through which the applications 5470 control functions provided from the kernel 5410 or the middleware 5430, and may include, for example, at least one interface or function (e.g., instruction) for file control, window control, image processing, or text control.

The input/output interface 5500, for example, may function as an interface that may transfer instructions or data input from a user or another external device to the other element(s) of the electronic device 5000. Furthermore, the input/output interface 5500 may output the instructions or data received from the other element(s) of the electronic device 5000 to the user or another external device.

The display 5600 may include, for example, a liquid crystal display (LCD), a light emitting diode (LED) display, an organic LED (OLED) display, a micro electro mechanical system (MEMS) display, or an electronic paper display. The display 5600, for example, may display various types of content (e.g., text, images, videos, icons, or symbols) for the user. The display 5600 may include a touch screen and receive, for example, a touch, gesture, proximity, or hovering input using an electronic pen or a part of a user's body. According to an embodiment of the present disclosure, the display 5600 may display a web page.

The communication interface 5700, for example, may set communication between the electronic device 5000 and an external device (e.g., the first external electronic device 5020, the second external electronic device 5040, or a server 5060). For example, the communication interface 5700 may be connected to a network 5620 through wireless or wired communication to communicate with the external device (e.g., the second external electronic device 5040 or the server 5060).

The wireless communication may use at least one of, for example, long term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM), as a cellular communication protocol. In addition, the wireless communication may include, for example, short range communication 5640. The short-range communication 5640 may include at least one of, for example, wireless fidelity (WiFi), Bluetooth, near field communication (NFC), and a global positioning system (GPS).

The wired communication may include at least one of, for example, a universal serial bus (USB), a high definition multimedia interface (HDMI), recommended standard 232 (RS-232), and a plain old telephone service (POTS).

The network 5620 may include at least one of a communication network such as a computer network (e.g., a local area network (LAN) or a wide area network (WAN)), the Internet, and a telephone network.

Each of the first and second external electronic devices 5020 and 5040 may be a device which is the same as or different from the electronic device 5000. According to an embodiment of the present disclosure, the server 5060 may include a group of one or more servers. According to various embodiments, all or a part of operations performed in the electronic device 5000 may be performed in the external electronic device 5020 or 5040 or the server 5060. According to an embodiment of the present disclosure, when the electronic device 5000 should perform some functions or services automatically or by a request, the electronic device 5000 may make a request for performing at least some functions related to the functions or services to the external electronic device 5020 or 5040, or the server 5060 instead of performing the functions or services by itself or additionally. The external electronic device 5020 or 5040, or the server 5060 may perform a function requested from the electronic device 5000 or an additional function and transfer the performed result to the electronic device 5000. The electronic device 5000 can provide the requested function or service to another electronic device by processing the received result as it is or additionally. For example, cloud computing, distributed computing, or client-server computing technology may be used.

According to various exemplary embodiments of the present disclosure, the electronic device 5000 may use at least one module operatively or physically separated from the processor 5200 to construct a web page, and insert information about a selected area of the web page, and manage the information of the selected area.

Figure 19:
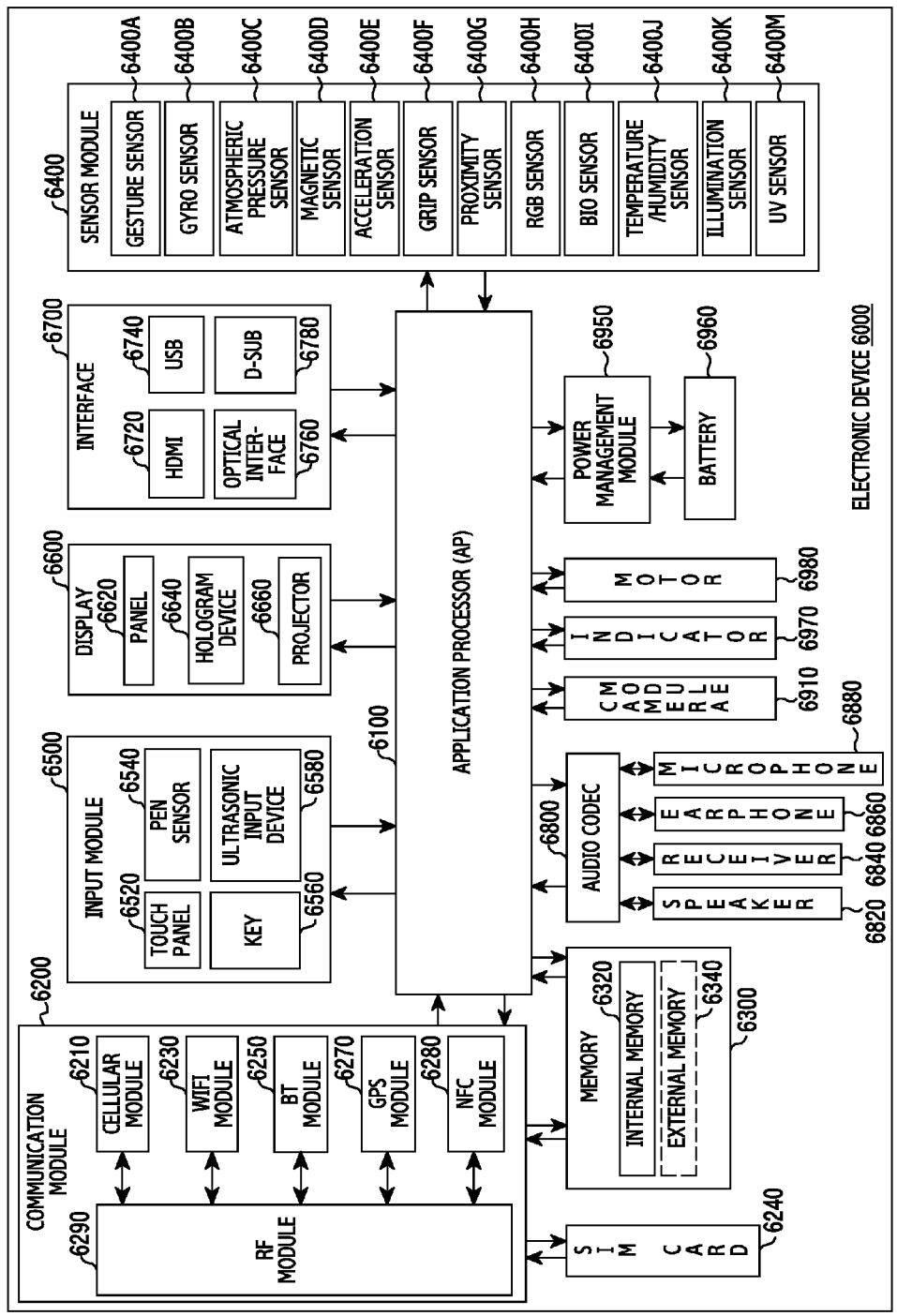
FIG. 19 is a block diagram of an electronic device according to an embodiment of the present disclosure.

FIG. 19 is a block diagram of an electronic device 6000 according to an embodiment of the present disclosure. In the following description, the electronic device 6000 may, for example, construct the whole or part of the electronic device 5000 illustrated in FIG. 18.

Referring to FIG. 19, the electronic device 6000 may include one or more APs 6100, a communication module 6200, a subscriber identification module (SIM) card 6240, a memory 6300, a sensor module 6400, an input module 6500, a display 6600, an interface 6700, an audio codec 6800, an camera module 6910, a power management module 6950, a battery 6960, an indicator 6970, or a motor 6980.

The AP 6100 may run an operating system or an application program to control a plurality of hardware or software constituent elements connected to the AP 6100, and may perform processing and operation of various data including multimedia data. The AP 6100 may be, for example, implemented as a system on chip (SoC). According to an embodiment of the present disclosure, the AP 6100 may further include a graphic processing unit (GPU).

The communication module 6200 (e.g., the communication interface 5700) may perform data transmission/reception in communication between the electronic device 6000 (e.g., the electronic device 5000) and other electronic devices connected through a network. According to an embodiment of the present disclosure, the communication module 6200 may include a cellular module 6210, a WiFi module 6230, a BT module 6250, a GPS module 6270, an NFC module 6280, and a radio frequency (RF) module 6290.

The cellular module 6210 may provide voice telephony, video telephony, a text service, or an Internet service, etc. through a telecommunication network (e.g., LTE, LTE-A, CDMA, WCDMA, UMTS, WiBro, or GSM, etc.). Also, the cellular module 6210 may, for example, use a SIM card 6240 to perform electronic device distinction and authorization within the telecommunication network. According to an exemplary embodiment of the present disclosure, the cellular module 6210 may perform at least some of functions that the AP 6100 may provide. For example, the cellular module 6210 may perform at least one part of a multimedia control function.

According to an embodiment of the present disclosure, the cellular module 6210 may include a communication processor (CP). Also, the cellular module 6210 may be, for example, implemented as an SoC. In FIG. 19, the elements such as the cellular module 6210 (e.g., the CP), the memory 6300, or the power management module 6950, etc. are illustrated as elements different from the AP 6100 but, according to an embodiment of the present disclosure, the AP 6100 may be implemented to include at least some (e.g., the cellular module 6210) of the aforementioned elements.

According to an embodiment of the present disclosure, the AP 6100 or the cellular module 6210 (e.g., the communication processor) may load an instruction or data, which is received from a non-volatile memory connected to each or at least one of other elements, to a volatile memory and process the loaded instruction or data. Also, the AP 6100 or the cellular module 6210 may store in the non-volatile memory data, which is received from at least one of the other elements or is generated by at least one of the other elements.

The WiFi module 6230, the BT module 6250, the GPS module 6270 or the NFC module 6280 each may include, for example, a processor for processing data transmitted/received through the corresponding module. In FIG. 19, the cellular module 6210, the WiFi module 6230, the BT module 6250, the GPS module 6270 or the NFC module 6280 is each illustrated as a separate block but, according to an embodiment of the present disclosure, at least some (e.g., two or more) of the cellular module 6210, the WiFi module 6230, the BT module 6250, the GPS module 6270 or the NFC module 6280 may be included within one IC or IC package. For example, at least some (e.g., a CP corresponding to the cellular module 6210 and a WiFi processor corresponding to the WiFi module 6230) of the processors corresponding to the cellular module 6210, the WiFi module 6230, the BT module 6250, the GPS module 6270 or the NFC module 6280 may be implemented as one SoC.

The RF module 6290 may perform transmission/reception of data, for example, transmission/reception of an RF signal. Though not illustrated, the RF module 6290 may include, for example, a transceiver, a power amplifier module (PAM), a frequency filter, or a low noise amplifier (LNA), etc. Also, the RF module 6290 may further include a component for transmitting/receiving an electromagnetic wave in free space in wireless communication, for example, a conductor or a conductive wire, etc. FIG. 19 illustrates that the cellular module 6210, the WiFi module 6230, the BT module 6250, the GPS module 6270 and the NFC module 6280 share one RF module 6290 with one another but, according to an embodiment of the present disclosure, at least one of the cellular module 6210, the WiFi module 6230, the BT module 6250, the GPS module 6270 or the NFC module 6280 may perform transmission/reception of an RF signal through a separate RF module.

According to an embodiment of the present disclosure, the RF module 6290 may include at least one antenna among a main antenna and a sub antenna which are operatively connected with the electronic device 6000. The communication module 6200 may use the main antenna and the sub antenna to support a multiple input multiple output (MIMO) such as diversity, etc.

The SIM card 6240 may be inserted into a slot provided in a certain position in the electronic device 6000. The SIM card 6240 may include unique identification information (e.g., an IC card identifier (ICCID)) or subscriber information (e.g., an international mobile subscriber identity (IMSI)).

The memory 6300 may include an internal memory 6320 or an external memory 6340. The internal memory 6320 may include, for example, at least one of a volatile memory (for example, a dynamic random access memory (DRAM), a static RAM (SRAM) and a synchronous dynamic RAM (SDRAM)) or a non-volatile memory (for example, a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, and a NOR flash memory).

According to an embodiment of the present disclosure, the internal memory 6320 may be a solid state drive (SSD). The external memory 6340 may further include a flash drive, for example, a compact flash (CF) drive, a secure digital (SD) memory card, a micro-SD memory card, a mini-SD memory card, an extreme digital (xD) memory card, or a memory stick, etc. The external memory 6340 may be operatively connected with the electronic device 6000 through various interfaces. According to an embodiment of the present disclosure, the electronic device 6000 may further include a storage device (or a storage media) such as a hard drive.

The sensor module 6400 may measure a physical quantity or sense an activation state of the electronic device 6000, and convert measured or sensed information into an electric signal. The sensor module 6400 may include, for example, at least one of a gesture sensor 6400A, a gyro sensor 6400B, an atmospheric pressure sensor 6400C, a magnetic sensor 6400D, an acceleration sensor 6400E, a grip sensor 6400F, a proximity sensor 6400G, a color sensor 6400H (e.g., a red, green, blue (RGB) sensor), a bio sensor 6400I, a temperature/humidity sensor 6400J, an illumination sensor 6400K, or an ultraviolet light (UV) sensor 6400M. Additionally or alternatively, the sensor module 6400 may include, for example, an electronic nose (E-nose) sensor, an electromyography (EMG) sensor, an electroencephalogram (EEG) sensor, an electrocardiogram (ECG) sensor, an infrared (IR) sensor, an iris sensor, or a fingerprint sensor, etc. The sensor module 6400 may further include a control circuit for controlling at least one or more sensors belonging therein.

The input device 6500 may include a touch panel 6520, a (digital) pen sensor 6540, a key 6560, or an ultrasonic input device 6580. The touch panel 6520 may, for example, detect a touch input in at least one of a capacitive overlay scheme, a pressure sensitive scheme, an infrared beam scheme, or an acoustic wave scheme. Also, the touch panel 6520 may further include a control circuit as well. In a case of the capacitive overlay scheme, physical contact or proximity detection is possible. The touch panel 6520 may further include a tactile layer as well. In this case, the touch panel 6520 may provide a tactile response to a user.

The (digital) pen sensor 6540 may be implemented in the same or similar method to receiving a user's touch input or by using a separate sheet for detection. The key 6560 may include, for example, a physical button, an optical key, or a keypad. The ultrasonic input device 6580 is a device capable of identifying data by sensing a sound wave in the electronic device 6000 through an input tool generating an ultrasonic signal, and enables wireless detection. According to an embodiment of the present disclosure, the electronic device 6000 may also use the communication module 6200 to receive a user input from an external device (e.g., a computer or a server) connected with this.

The display 6600 (e.g., the display 5600) may include a panel 6620, a hologram device 6640, or a projector 6660. The panel 6620 may be, for example, a LCD or an active-matrix OLED (AMOLED), etc. The panel 6620 may be, for example, implemented to be flexible, transparent, or wearable. The panel 6620 may be constructed as one module along with the touch panel 6620 as well. The hologram device 6640 may use the interference of light to show a three-dimensional image in the air. The projector 6660 may project light onto a screen to display an image. The screen may be, for example, located internal or external to the electronic device 6000. According to an embodiment of the present disclosure, the display 6600 may further include a control circuit for controlling the panel 6620, the hologram device 6640, or the projector 6660.

The interface 6700 may include, for example, a HDMI 6720, a USB 6740, an optical interface 6760, or a D-sub-miniature (D-sub) connector 6780. Additionally or alternatively, the interface 6700 may include, for example, a mobile high-definition link (MHL) interface, an SD memory card/multi media card (MMC) interface or an Infrared Data Association (IrDA) standard interface.

The audio codec 6800 may convert a voice to an electric signal and visa versa. The audio module 6800 may, for example, process sound information which is inputted or outputted through a speaker 6820, a receiver 6840, an earphone 6860, or a microphone 6880, etc.

The camera module 6910 is a device able to take a still picture and a moving picture. According to an embodiment of the present disclosure, the camera module 6910 may include one or more image sensors (e.g., a front sensor or a rear sensor), a lens, an image signal processor (ISP), or a flash (e.g., an LED or a xenon lamp).

The power management module 6950 may manage electric power of the electronic device 6000. The power management module 6950 may include, for example, a power management IC (PMIC), a charger IC, or a battery gauge.

The PMIC may be, for example, mounted within an IC or a SoC. A charging scheme may be divided into a wired charging scheme and a wireless charging scheme. The charger IC may charge the battery 6960, and may prevent the inflow of overvoltage or overcurrent from an electric charger. According to an embodiment of the present disclosure, the charger IC may include a charger IC for at least one of the wired charging scheme or the wireless charging scheme. The wireless charging scheme may, for example, be a magnetic resonance scheme, a magnetic induction scheme, or an electromagnetic wave scheme, etc. A supplementary circuit for wireless charging, for example, a circuit such as a coil loop, a resonance circuit, or a rectifier may be added.

The battery gauge may, for example, measure a level of the battery 6960, a voltage during charging, a current or a temperature. The battery 6960 may generate or store electricity, and use the stored or generated electricity to supply power to the electronic device 6000. The battery 396 may include, for example, a rechargeable battery or a solar battery.

The indicator 6970 may display a status of the electronic device 6000 or one part (e.g., the AP 6100) thereof, for example a booting state, a message state, or a charging state, etc. The motor 6980 may convert an electrical signal into a mechanical vibration. The electronic device 6000 may include a processing device (e.g., a GPU) for mobile TV support. The processing device for mobile TV support may, for example, process media data according to the standards of digital multimedia broadcasting (DMB), digital video broadcasting (DVB), or a media flow.

Figure 20:
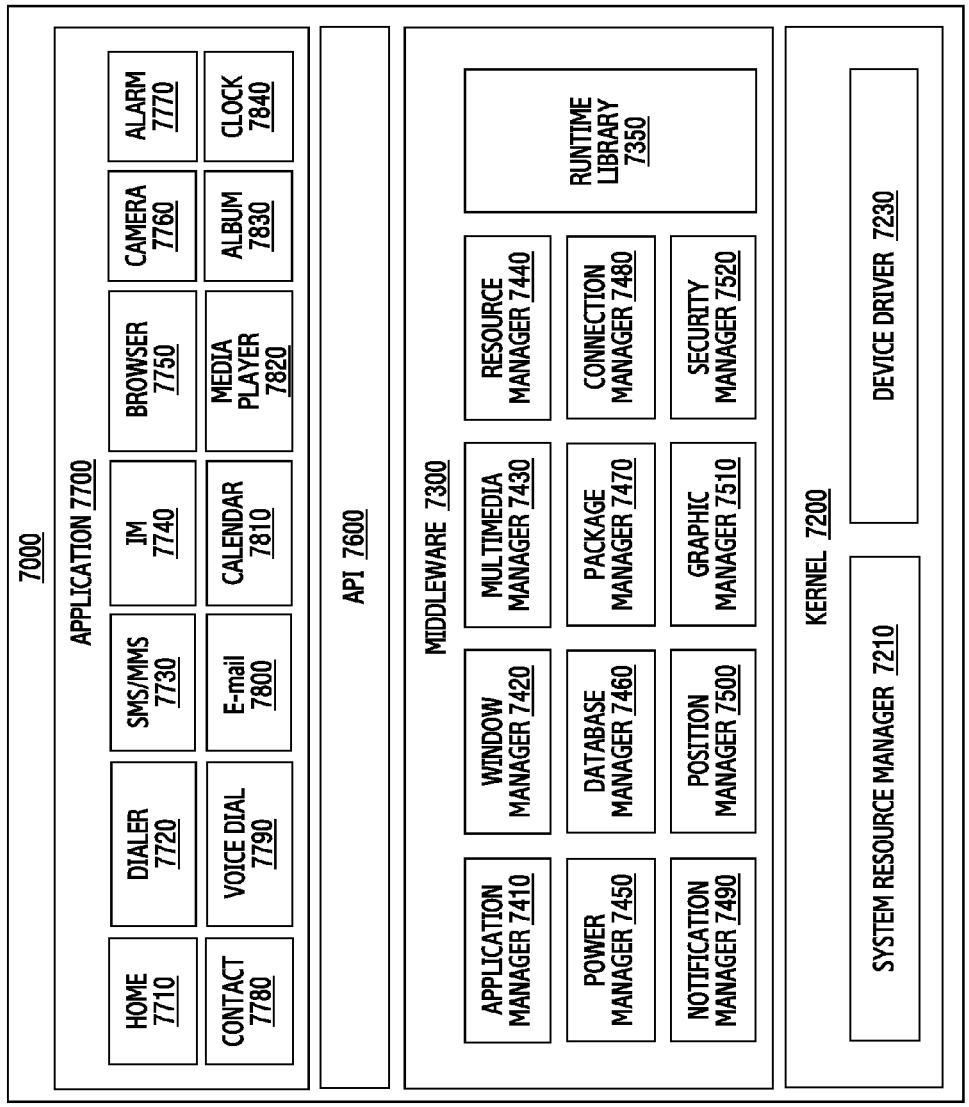
FIG. 20 is a block diagram of a program module according to an embodiment of the present disclosure.

FIG. 20 is a block diagram of a program module according to an embodiment of the present disclosure. The program module 7000 (e.g., a program 5400) may include an OS for controlling resources associated with an electronic apparatus (for example, the electronic device 5000) and/or various applications (for example, an application program 5470) running on the OS. The operating system may be, for example, Android®, iOS®, Windows®, Symbian™, Tizen®, Bada™, or the like.

The programming module 7000 may include a kernel 7200, middleware 7300, an API 7600, and/or an application 7700. At least a part of the program module 7000 can be preloaded on the electronic device or downloaded from the server.

The kernel 7200 (for example, the kernel 5410) may include, for example, a system resource manager 7210 or a device driver 7230. The system resource manager 7210 may control, allocate, or collect the system resources. The system resource manager 7210 may include a process management unit, a memory management unit, or a file system management unit. The device driver 7230 may include, for example, a display driver, a camera driver, a Bluetooth driver, a shared-memory driver, a USB driver, a keypad driver, a Wi-Fi driver, an audio driver, or an inter-process communication (IPC) driver. According to an embodiment of the present disclosure, a Wi-Fi driver of the kernel 7200 may control at least one of an antenna mode or a transmission period of a network control message for use to transmit and receive signals to and from the communication interface 5700.

The middleware 7300 may provide, for example, a function commonly required by the applications 7700 in common or provide various functions to the applications 7700 through the API 7600 so that the applications 7700 can efficiently use limited system resources within the electronic device. According to an embodiment of the present disclosure, the middleware 7300 (for example, the middleware 5430) may include, for example, at least one of a runtime library 7350, an application manager 7410, a window manager 7420, a multimedia manager 7430, a resource manager 7440, a power manager 7450, a database manager 7460, a package manager 7470, a connection manager 7480, a notification manager 7490, a position manager 7500, a graphic manager 7510, and a security manager 7520.

The runtime library 7350 may include, for example, a library module that a compiler uses to add new functions through a programming language while the application 7700 is executed. The run time library 7350 may perform input/output management, memory management, or a function for an arithmetic function.

The application manager 7410 may manage, for example, a life cycle of at least one of the applications 7700. The window manager 7420 may manage graphical user interface (GUI) resources used by a screen. The multimedia manager 7430 may grasp formats required for the reproduction of various media files, and may perform an encoding or decoding of the media file by using a codec suitable for the corresponding format. The resource manager 7440 may manage resources such as a source code, a memory, and a storage space of at least one of the applications 7700.

The power manager 7450 may operate together with a basic input/output system (BIOS) to manage a battery or power and may provide power information required for the operation of the electronic device. The database manager 7460 may generate, search for, or change a database to be used by at least one of the applications 7700. The package manager 7470 may manage the installation or the updating of applications distributed in the form of package file.

The connection manager 7480 may manage wireless connection of, for example, Wi-Fi or Bluetooth. The notification manager 7490 can display or notify of an event such as an arrival message, promise, proximity notification, and the like in such a way that does not disturb a user. The location manager 7500 may manage location information of the electronic device. The graphic manager 7510 may manage graphic effects to be provided to a user and user interfaces related to the graphic effects. The security manager 7520 may provide all security functions required for system security or user authentication.

According to an embodiment of the present disclosure, the middleware 7300 may control at least one of the transmission period of an antenna mode or a transmission period of a network control message for use to transmit and receive signals to and from the communication interface 5700 by using at least one manager.

According to an embodiment of the present disclosure, when the electronic device (for example, electronic device 5000) has a call function, the middleware 7300 may further include a telephony manager for managing a voice call function or a video call function of the electronic device.

The middleware 7300 may include a middleware module for forming a combination of various functions of the aforementioned components. The middleware 7300 may provide modules specialized according to types of operating systems in order to provide differentiated functions. Further, the middleware 7300 may dynamically remove some of the existing components or add new components.

The API 7600 (for example, the API 5450) is, for example, a set of API programming functions, and a different configuration thereof may be provided according to an operating system. For example, with respect to each platform, one API set may be provided in a case of Android® or iOS®, and two or more API sets may be provided in a case of Tizen™.

The applications 7700 (for example, the application programs 5470) may include, for example, one or more applications which can provide functions such as a home application 7710, a dialer application 7720, a short message service/multimedia messaging service (SMS/MMS) application 7730, an instant messaging application (IM) 7740, a browser application 7750, a camera application 7760, an alarm application 7770, a contacts application 7780, a voice dialer application 7790, an email application 7800, a calendar application 7810, a media player application 7820, an album application 7830, a clock application 7840, a health care application (for example, to measure a quantity of exercise or a blood sugar level), or an environmental information application (for example, atmospheric pressure, humidity, or temperature information).

According to an embodiment of the present disclosure, the application 7700 may include an application ("information exchange application") that supports the exchange of information between the electronic device (for example, the electronic device 5000) and the external electronic device. The application associated with exchanging information may include, for example, a notification relay application for notifying an external electronic device of certain information or a device management application for managing an external electronic device.

For example, a notification relay application may include a function of transferring the notification information generated by other applications of the electronic device (for example, SMS/MMS application, an e-mail application, a healthcare application, or an environmental information application, etc.) to the external electronic device. Further, the notification relay application may receive notification information from, for example, the external electronic device and provide the received notification information to the user. For example, the device management application may manage (e.g., install, delete, or update) at least one function (e.g., turning on/off the external electronic device itself (or some elements thereof) or adjusting the brightness (or resolution) of a display) of the external electronic device communicating with the electronic device, applications operating in the external electronic device, or services (e.g., a telephone call service or a message service) provided from the external electronic device.

According to an embodiment of the present disclosure, the application 7700 may include an application (for example, a health management application) specified according to an attribute (for example, as an attribute of the electronic device, the type of electronic device is a mobile medical equipment) of the external electronic device. The application 7700 may include an application received from the external electronic device (for example, a server or an electronic device). The applications 7700 may include a preloaded application or a third party application which can be downloaded from the server. The names of the elements of the program module 7000, according to in FIG. 20, may vary according to the type of OS.

According to an embodiment of the present disclosure, at least a part of the programming module 7000 may be implemented in software, firmware, hardware, or a combination of two or more thereof. At least a part of the program module 7000 can be implemented (e.g., executed), for example, by a processor (for example, by an application program). At least some of the programming module 7000 may include, for example, a module, program, routine, sets of instructions, or process for performing one or more functions.

According to an embodiment of the present disclosure, an electronic device may insert an attribute variable (e.g., a tag) for selecting and displaying to at least one area of a web page selected by input information, thereby displaying a plurality of areas selected by a user on the web page.

According to an embodiment of the present disclosure, the electronic device may extract and store construction information of the at least partial area of the web page to which the attribute variable for selecting and displaying is inserted, thereby separately managing areas selected by the user.

The term "module" as used herein may, for example, indicate a unit including one of hardware, software, and firmware or a combination of two or more of them. The term "module" may be interchangeably used with, for example, the terms "unit," "logic," "logical block," "component," or "circuit." The term "module" may indicate a minimum unit of an integrated component element or a part thereof. The term "module" may indicate a minimum unit for performing one or more functions or a part thereof. The term "module" indicate a device that may be mechanically or electronically implemented. For example, the term "module" according to an embodiment of the present disclosure may include at least one of an application specific IC (ASIC), a field programmable gate array (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a non-transitory computer-readable storage medium in a programming module form. The instruction, when executed by a processor (e.g., the processor 5200), may cause the one or more processors to execute the function corresponding to the instruction. The non-transitory computer-readable storage medium may be, for example, the memory.

The non-transitory computer-readable recoding medium may include a hard disk, a floppy disk, magnetic media (e.g., a magnetic tape), optical media (e.g., a compact disc ROM (CD-ROM) and a digital versatile disc (DVD)), magneto-optical media (e.g., a floptical disk), a hardware device (e.g., a ROM, a RAM, a flash memory), and the like. In addition, the program instructions may include high level language code, which may be executed in a computer by using an interpreter, as well as machine code generated by a compiler. The aforementioned hardware device may be configured to operate as one or more software modules in order to perform the operation of the present disclosure, and vice versa.

The programming module according to an embodiment of the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added. Further, the embodiments disclosed in this document are only for the description and understanding of technical contents and do not limit the scope of the present disclosure. Accordingly, the scope of the present disclosure is intended to be construed as including all modifications or various other embodiments based on the present disclosure.

The embodiments of the present disclosure disclosed in the specification and the drawings are only particular examples provided in order to easily describe the present disclosure and help with comprehension of the present disclosure, but are not intended to limit the scope of the present disclosure. Therefore, in addition to the embodiments disclosed herein, the scope of the present disclosure should be construed to include all modifications or modified forms drawn based on the scope of the present disclosure as defined by the appended claims and their equivalents.

What is claimed is:

1. An apparatus for charging a battery of an electronic device, the apparatus, comprising:
   a battery configured to supply power to the electronic device;
   a charger configured to charge the battery according to a set charging voltage (V_SET) and a charging current (I_SET); and
   a controller configured to set the V_SET and the I_SET, receive an output value of at least one of the charger and the battery while charging the battery, and change the V_SET while charging the battery if the output value corresponds to a pre-set reference range.

2. The apparatus of claim 1, wherein the pre-set reference range is one of where a battery cell feedback voltage (V_CELL_FB) is lower than a battery cell reference voltage (V_CELL_REF), where a battery cell feedback current (I_CELL_FB) is lower than the I_SET and the V_CELL_FB is lower than the V_CELL_REF, where a battery cell voltage inclination (ΔV_CELL) is less than a pre-set reference value and the V_CELL_FB is lower than the V_CELL_REF, and where an output-node feedback voltage (V_CHG_FB) of the charger is equal to the V_SET and the V_CELL_FB is lower than the V_CELL_REF.

3. The apparatus of claim 1, wherein if a feedback voltage or a current corresponds to the pre-set reference range, the controller is further configured to increase the V_SET step by step by pre-determined voltage.

4. The apparatus of claim 3, wherein the controller, after increasing the V_SET, is further configured to determine whether V_CELL_FB is greater than V_CELL_REF, and if the V_CELL_FB is greater than the V_CELL_REF, decrease the V_SET step by step by pre-determined voltage until the V_CELL_FB does not exceed the V_CELL_REF.

5. The apparatus of claim 2, wherein the V_CELL_REF is a pre-set value determined such that the V_SET is not increased to be greater than or equal to the pre-confirmed V_SET at which the V_CELL is increased to a battery nominal charging voltage (V_SET_DESIGN) during charging while increasing the V_SET.

6. A method of controlling battery charging by compensating for a voltage drop between a battery and a charger, the method comprising:
   setting a charging voltage (V_SET) and a charging current (I_SET) in association with the charging of the battery;
   measuring an output value of at least one of the battery and the charger while charging the battery;
   determining whether the output value corresponds to a pre-set reference range; and
   if the output value corresponds to the pre-set reference range, changing the V_SET while charging the battery.

7. The method of claim 6, wherein determining whether the output value corresponds to the pre-set reference range determines one of whether a battery cell feedback voltage (V_CELL_FB) is less than a battery cell reference voltage (V_CELL_REF), a battery cell feedback current (I_CELL_FB) is less than the I_SET and the V_CELL_FB is less than the V_CELL_REF, a battery cell voltage inclination (ΔV_CELL) is less than a pre-set reference value and the V_CELL_FB is less than the V_CELL_REF, and an output-node feedback voltage (V_CHG_FB) of the charger is equal to the V_SET and the V_CELL_FB is less than the V_CELL_REF.

8. The method of claim 6, wherein changing the V_SET comprises increasing the V_SET step by step by a pre-determined voltage.

9. The method of claim 6, further comprising:
   determining, after changing the V_SET, whether V_CELL_FB is greater than V_CELL_REF; and
   decreasing, if the V_CELL_FB is greater than the V_CELL_REF, the V_SET step by step until the V_CELL_FB does not exceed the V_CELL_REF.

10. The method of claim 9, wherein the V_CELL_REF is a pre-set value determined such that the V_CELL FB does not exceed a battery pack safety reference during charging while increasing the V_SET.

11. A method of controlling battery charging by compensating for a voltage drop between a battery and a charger, the method comprising:
 setting a charging voltage (V_SET) and a charging current (I_SET) in association with the charging of the battery;
 determining whether a battery cell feedback voltage (V_CELL_FB) is less than a battery cell reference voltage (V_CELL_REF); and
 changing, if V_CELL FB is less than the V_CELL_REF, the V_SET while charging the battery.

12. The method of claim 11, wherein setting the V_SET and the I_SET further comprises setting a battery nominal charging voltage (V_SET_DESIGN) and a battery nominal charging current (I_SET_DESIGN) in association with a product of a charging voltage per battery cell and a number of battery cells coupled in series.

13. The method of claim 11, wherein changing the V_SET comprises adding a difference between the V_CELL_REF and the V_CELL_FB to the V_SET or adding the difference between the V_CELL_REF and the V_CELL_FB and a pre-determined voltage to the V_SET.

14. The method of claim 11, further comprising:
 determining, after changing the V_SET, whether the V_CELL_FB is greater than the V_CELL_REF; and
 decreasing, if the V_CELL_FB is greater than the V_CELL_REF, the V_SET step by step until the V_CELL_FB does not exceed the V_CELL_REF.

15. The method of claim 14, further comprising, if the V_CELL_FB is not greater than the V_CELL_REF, ending the charging of the battery upon detecting of a charging end condition.

16. The method of claim 15, wherein the V_CELL_REF is a pre-set value predetermined such that the V_SET is not increased to be greater than or equal to the pre-confirmed V_SET at which the V_CELL_FB is increased to the V_CELL_REF during charging while increasing the V_SET to a point where the V_CELL_FB is low.

17. The method of claim 11, further comprising, if the V_CELL_FB is less than the V_CELL_REF, increasing the V_SET step by step by changing the V_SET.

18. The method of claim 17, wherein changing the V_SET is comprised of repetitively changing the V_SET if the I_CELL_FB is less than the I_SET and if the V_CELL_FB is less than the V_CELL_REF, and the V_SET is increased step by step by a pre-determined voltage, where V_SET =V_SET +a, and where I_CELL_FB <I_SET AND V_CELL_FB <V_CELL_REF.

\* \* \* \* \*